(12) United States Patent
Vaught et al.

(10) Patent No.: US 12,175,422 B2
(45) Date of Patent: Dec. 24, 2024

(54) ON-HAND INVENTORY ACCURACY SYSTEM

(71) Applicant: Walmart Apollo, LLC, Bentonville, AR (US)

(72) Inventors: Sara Vaught, Centerton, AR (US); Hoang-Anh Au, Centerton, AR (US); Christopher Ryan Heeney, Bella Vista, AR (US); Marc Fletter, Bentonville, AR (US); Jeffrey S. Cruz, Bentonville, AR (US); Ryan Sands Magnusson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 246 days.

(21) Appl. No.: 17/708,139

(22) Filed: Mar. 30, 2022

(65) Prior Publication Data
US 2022/0318731 A1    Oct. 6, 2022

Related U.S. Application Data

(60) Provisional application No. 63/168,523, filed on Mar. 31, 2021.

(51) Int. Cl.
*G06Q 10/087* (2023.01)
*G06K 7/10* (2006.01)

(52) U.S. Cl.
CPC ....... *G06Q 10/087* (2013.01); *G06K 7/10366* (2013.01)

(58) Field of Classification Search
CPC .............................. G06Q 10/08; G06Q 10/087
See application file for complete search history.

(56) References Cited

U.S. PATENT DOCUMENTS

| | | | |
|---|---|---|---|
| 7,398,232 B2 | 7/2008 | Renz et al. | |
| 8,965,796 B1 * | 2/2015 | Gala | G06Q 20/203 705/28 |

(Continued)

OTHER PUBLICATIONS

"!D Cloud App", Nov. 2018, https://web.archive.org/web/20181116014503/http://www.nedap-retail.com/solutions/id-cloud/id-cloud-app/ (Year: 2018).*

(Continued)

*Primary Examiner* — Allen C Chein
(74) *Attorney, Agent, or Firm* — Foley IP Law, PLLC

(57) ABSTRACT

Examples provides on-hand inventory accuracy using radio frequency identification (RFID) tag data and expected populations of items for a plurality of sub-locations within a scan area. The system calculates a dynamic expected population of items value for each sub-location using item level data and modular display data for an item assortment assigned to a modular display within each sub-location. If the items detected by the RFID tag data match the expected population of items with a minimum confidence level, the system provides user feedback in the form of status indicators and/or accuracy indicators on a user interface. The feedback can also include audio feedback. If a discrepancy is detected, the system requests a rescan of each sub-location having a detected discrepancy. The system disallows update of on-hand inventory data using the RFID tag data if the discrepancy remains unresolved after the second scan and/or requests a manual verification.

18 Claims, 40 Drawing Sheets

(56) References Cited

U.S. PATENT DOCUMENTS

| | | | |
|---|---|---|---|
| 9,619,683 B2* | 4/2017 | Zumsteg | G06K 7/10881 |
| 2006/0178953 A1* | 8/2006 | Aggarwal | G06Q 10/063 |
| | | | 705/28 |
| 2015/0262116 A1 | 9/2015 | Katircioglu et al. | |
| 2018/0189725 A1* | 7/2018 | Mattingly | G06K 19/0723 |
| 2018/0293543 A1* | 10/2018 | Tiwari | G05D 1/0274 |
| 2018/0300671 A1 | 10/2018 | Richardson et al. | |

OTHER PUBLICATIONS

Mckay, "Connecting to the Zebra RFD8500 UHF RFID Reader", Sep. 2019, https://rfid4ustore.com/rfid-geeks/connecting-to-the-zebra-rfd8500-uhf-rfid-reader/, ) (Year: 2019).*

* cited by examiner

ON-HAND INVENTORY ACCURACY SYSTEM

BACKGROUND

On-hand inventory refers to the types of items and number of each type of item within current inventory of a store, distribution center (DC), warehouse, or location. On-hand inventory is updated when new shipments of items are received from a manufacturer or other supplier. On-hand inventory is also updated in response to products sold, damaged, returned to the supplier, lost or otherwise no longer available within current inventory. Inventory can be updated based on manual inventory checks, in which users manually scan barcodes or make visual inspections of items to verify the number of items available in on-hand inventory. These methods are inefficient and time-consuming.

Radio frequency identification (RFID) tag data obtained from RFID tags on products can be used to update inventory data. However, RFID tag readers only read data from tags within a certain range. If the reader is not brought within an adequate proximity to the target tags, then the target tags are not detected. Moreover, RFID tags on items can be removed, lost, or broken making the RFID tag data gathered by an RFID tag reader inaccurate or incomplete. In such cases, updating inventory data using the RFID tag data can result in inventory errors. These errors can result in item outages, overstock, and other inventory errors.

SUMMARY

Some examples provide a method for on-hand inventory accuracy using RFID tag data. A calculation component calculates an expected population of items for a selected scan location within a plurality of scan locations in a scan area. The expected population of items includes a set of item types associated with at least a portion of a modular display within the scan location. An analysis component analyzes radio frequency identification (RFID) tag data received from a plurality of RFID tags associated with a plurality of items within the selected scan location to identify a set of detected item types. A comparison component compares the set of detected item types with the expected population of items using a threshold to determine whether a discrepancy exists between the set of detected item types and the expected population of items. A status indicator is updated from a scan incomplete indicator to a scan complete indicator in response to the comparison indicating a lack of discrepancy between the expected population of items and the set of detected items. Rescan instructions are provided in response to detecting the discrepancy.

Other examples provide a system for on-hand inventory accuracy. The system include a plurality of RFID tags associated with a plurality of items within a selected scan location of a scan zone. The scan location includes a modular display. A computing device receives RFID tag data from an RFID tag reader. The computing device includes at least one memory communicatively coupled to at least one processor. An accuracy component calculates an expected population of items for the selected scan location based on item level data and modular display data. The expected population of items includes a set of item types in an item assortment. The RFID tag data is analyzed to identify a set of detected item types. The set of detected item types are compared with the expected population of items. A determination is made whether a discrepancy exists between the set of detected item types and the expected population of items. A status indicator is updated from a scan incomplete indicator to a scan complete indicator in response to the comparison indicating a lack of discrepancy. Rescan instructions are provided in response to detecting the discrepancy.

Still other examples provide one or more computer storage devices having computer-executable instructions stored thereon, which, on execution by a computer, cause the computer to perform operations including analyzing RFID tag data to identify a set of detected item types; comparing the set of detected item types with an expected population of items calculated based on item level data and modular display data; determine whether a discrepancy exists between the set of detected item types and the expected population of items; output a status indicator associated with the selected scan location, the status indicator indicating whether a scan of the selected scan location is complete or incomplete based on a result of the comparison of the expected population of items and the set of detected items; and reject an update of on-hand inventory data using the RFID tag data received from the plurality of RFID tags if the comparison indicates the discrepancy between the detected item types and the expected population of items exists. The update of the on-hand inventory data is rejected until the discrepancy is resolved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
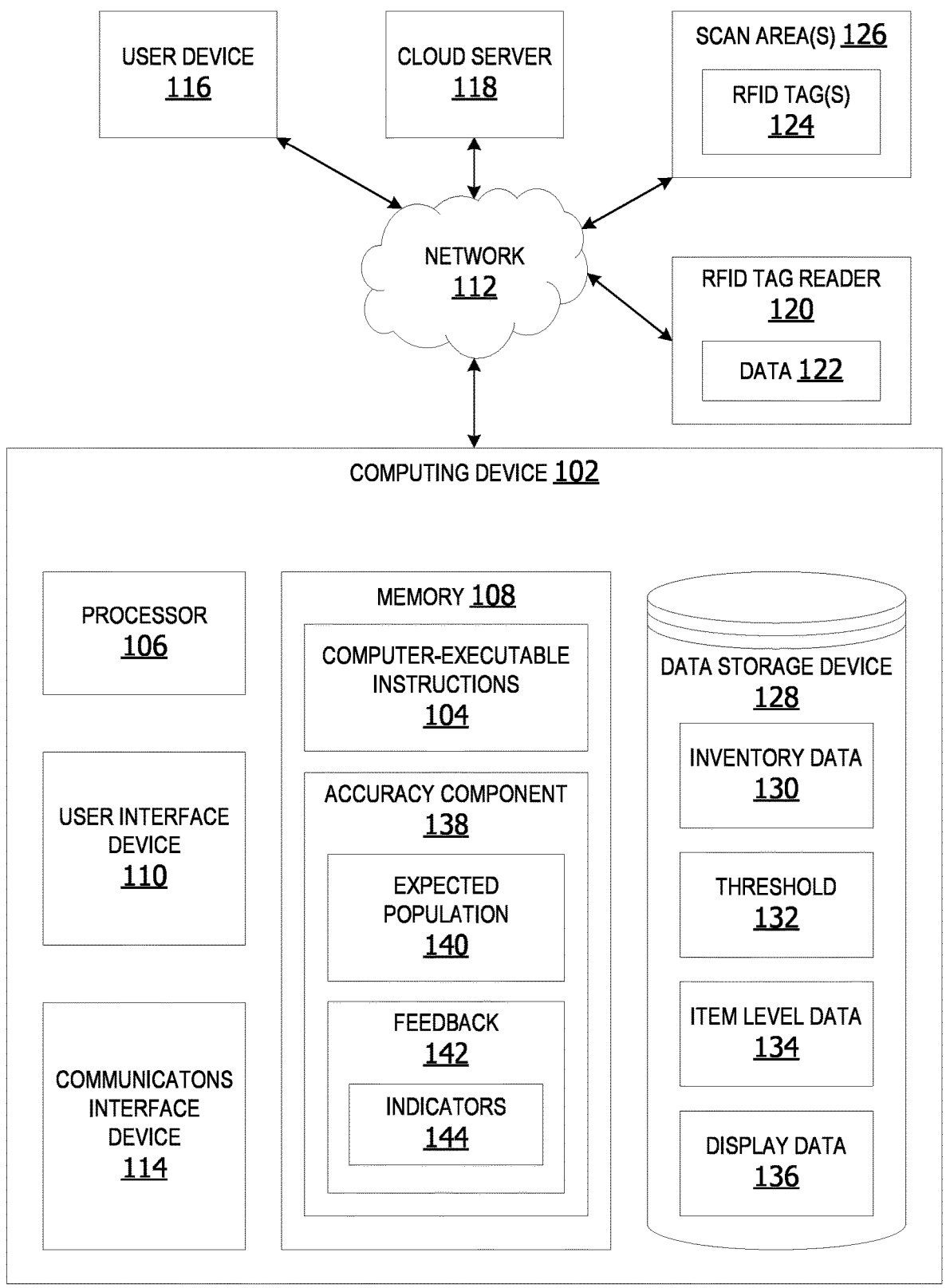
FIG. 1 is an exemplary block diagram illustrating a system for on-hand inventory accuracy using radio frequency identification (RFID) tag data.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

RFID tag readers have a limited range. These readers only detect tags within a given range of the reader. Any tags outside the detection range of a given RFID tag reader are not read by that reader. Thus, if a reader does not get close enough to a subset of the target tags within a target area, the subset of the target tags are left out of the read. Any subsequent inventory updates based on detected tags introduces errors because the reading protocol assumes a complete read and uses the values taken within those reads to directly update on-hand inventory values.

Typically, a determination as to whether an RFID tag scan using an RFID tag reader is complete is left to an individual user's discretion and abilities. Traditional reading protocol requires users to manually keep mental track of their coverage of the target area to ensure they have come within reasonable proximity to all target tags. However, human short-term memory is unreliable. Moreover, variability in user capacities and performance with regard to tracking read progress in large target areas, results in unreliable results and variable accuracy. This manual tracking is cumbersome, un-reliable and prone to error.

Referring to the figures, examples of the disclosure enable on-hand inventory accuracy determination using radio frequency identification (RFID) tag data. This system enables improved tracking of RFID scan target areas and more accurate determinations as to whether a given RFID tag reader proximity to target RFID tags in a target area is adequate.

In some examples, an accuracy component generates a unique expected population of items for each sub-location within a scan area. When a sub-location is scanned, the scan data is compared with the expected population of items to determine whether the RFID tag data is accurate and complete. If a discrepancy is detected between the detected items identified in the RFID tag data and the expected population of items, the system does not permit on-hand inventory to be updated. This ensures more accurate inventory data and prevents inaccurate changes to inventory.

Other aspects provide status indicators and accuracy indicators informing the user as to status of scans and accuracy of scans being performed in sub-locations of a scan area. This improves user efficiency via the user interface interaction and increased user interaction performance.

In still other examples, the accuracy component prevents users from changing inventory data without verifying accuracy of the RFID tag data obtained during scans of RFID tagged items. This reduces error rate in inventory updates and improves accuracy of on-hand inventory records.

Referring again to FIG. 1, an exemplary block diagram illustrates a system 100 for on-hand inventory accuracy using radio frequency identification (RFID) tag data. In the example of FIG. 1, the computing device 102 represents any device executing computer-executable instructions 104 (e.g., as application programs, operating system functionality, or both) to implement the operations and functionality associated with the computing device 102. The computing device 102, in some examples, includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 8, FIG. 9, FIG. 10, FIG. 11, and FIG. 12).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLU-ETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to, a user device 116, a cloud server 118 and/or an RFID tag reader 120, can occur using any protocol or mechanism over any wired or wireless connection. In some examples, the communications interface component 114 is operable with short range communication technologies such as by using near-field communication (NFC) tags.

The user device 116 represent any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface device.

The cloud server 118 is a logical server providing services to the computing device 102 or other clients, such as, but not limited to, the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The RFID tag reader 120 is a device for receiving or otherwise obtaining RFID tag data 122 from one or more RFID tag(s) 124 within one or more scan area(s) 126. The RFID tag reader 120 can be implemented as a hand-held reader, such as, but not limited to, a mobile RFID tag reader module, a hand-held RFID tag reader wand, or any other type of tag reader. In some examples, the RFID tag reader 120 can gather data associated with 15,000 items per second. The RFID tag reader 120 is connected to a handheld computing device capable of displaying data to a user performing the scan via a user interface, such as, but not limited to, the user device 116.

The user performing the scan in this example is a human user. However, in other examples, a scan of a target area (scan zone) can be performed by a drone, a mounted (automated) scanner device, and/or any other type of robotic device for scanning. For example, a scan can be performed by a self-navigating robotic device capable of moving up and down aisles and around displays while performing scans with one or more RFID tag scanners associated with the robotic device. In other non-limiting examples, an aerial drone can fly over (above) a target area and conduct a scan to read RFID tags attached to items within the scan zone. The tagged elements within the scan zone can include tagged products within a retail environment, tagged animals within a wildlife refuge, tagged pallets in a loading area, tagged plants in a botanical garden, or any other type of target zone including MD tagged elements.

The RFID tag reader 120 can be a hand-held or portable RFID tag reader. In other examples, the RFID tag reader 120 is a fixed RFID tag reader mounted or otherwise attached to a display or fixture. For example, the RFID tag reader 206 can be mounted to a ceiling, wall, pillar, shelf; cabinet, display, or other location.

A scan area is any target area including one or more RFID tagged elements within the scan area. A scan area can include an indoor area, an outdoor area, an area that is partially enclosed, as well as an area which includes both indoor and outdoor spaces. The scan area in some non-limiting examples is an area within a retail area or an item storage area. However, in other examples, the scan area can include an open space, a park, a garden, wild-life area, a lake, a field, an industrial complex, as well as any other target area for conducting a scan of RFID tags.

A scan area can include, but is not limited to, a department within a store, an area within a backroom storage area, an area within a distribution center, an area within an order fulfillment center or any other space including RFID tagged items. For example, but without limitation, a can area can include a men's clothing department, a shoe department, a garden center, a toy department, or any other area containing items having RFID tags associated with the items.

A tagged element includes anything which is RFID tagged. A tagged element can include an inanimate or non-living item, as well as living things, such as plants and/or animals. An RFID tag is attached to an element if it is printed on the item, attached to a portion of the item, attached to a portion of a package or label associated with the item, or otherwise associated with the element.

The system 100 can optionally include a data storage device 1128 for storing data, such as, but not limited to inventory data 130, threshold 132, item level data 134, and/or display data 136. The inventory data 130 is data identifying items in inventory for a store, DC, backroom storage area, item fulfillment center, pick area, or any other scan area. The inventory data 130, in some examples, includes data identifying types of items and/or the number of each type of item. For example, the inventory data can include an identification of types of items, such as, but not limited to, short-sleeved red t-shirts and long-sleeved red t-shirt. The inventory data can also include the number of each type of item in inventory, such as, but not limited to, five size small, short-sleeved red t-shirts, nine size small long-sleeved red t-shirt, twelve size large red short-sleeved t-shirts, three medium long-sleeved red t-shirts, etc.

The data storage device 128 can include one or more different types of data storage devices, such as, for example, one or more rotating disks drives, one or more solid state drives (SSDs), and/or any other type of data storage device. The data storage device 128, in some non-limiting examples, includes a redundant array of independent disks (RAID) array. In other examples, the data storage device 128 includes a database.

The data storage device 128, in this example, is included within the computing device 102, attached to the computing device, plugged into the computing device, or otherwise associated with the computing device 102. In other examples, the data storage device 128 includes a remote data storage accessed by the computing device via the network 112, such as a remote data storage device, a data storage in a remote data center, or a cloud storage.

The memory 108, in some examples, stores an accuracy component 138. In some examples, the accuracy component 138 is executed by the processor 106 of the computing device 102, calculates an expected population of items for a selected scan location within a plurality of scan locations in a scan area. The expected population of items comprising a set of item types associated with at least a portion of a modular display within the scan location.

The accuracy component 138, in some examples, analyzes RFID tag data received from a plurality of RFID tags associated with a plurality of items within the selected scan location to identify a set of detected item types. The accuracy component 138 compares the set of one or more detected item types with the expected population of items using a threshold to determine whether a discrepancy exists between the set of detected item types and the expected population of items.

In other examples, the accuracy component updates a status indicator associated with the selected scan location from a scan incomplete indicator to a scan complete indicator in response to the comparison indicating a lack of discrepancy between the expected population of items and the set of detected items. The indicators are displayed within a user interface, such as, but not limited to, the user interface device 110 in FIG. 1.

In still other examples, the accuracy component 138 generates rescan instructions. The rescan instructions provide instructions directing a user to rescan one or more sub-locations within the scan area. The rescan instructions can include identification of one or more locations to rescan. The rescan instructions are presented to the user via the user interface device.

Figure 2:
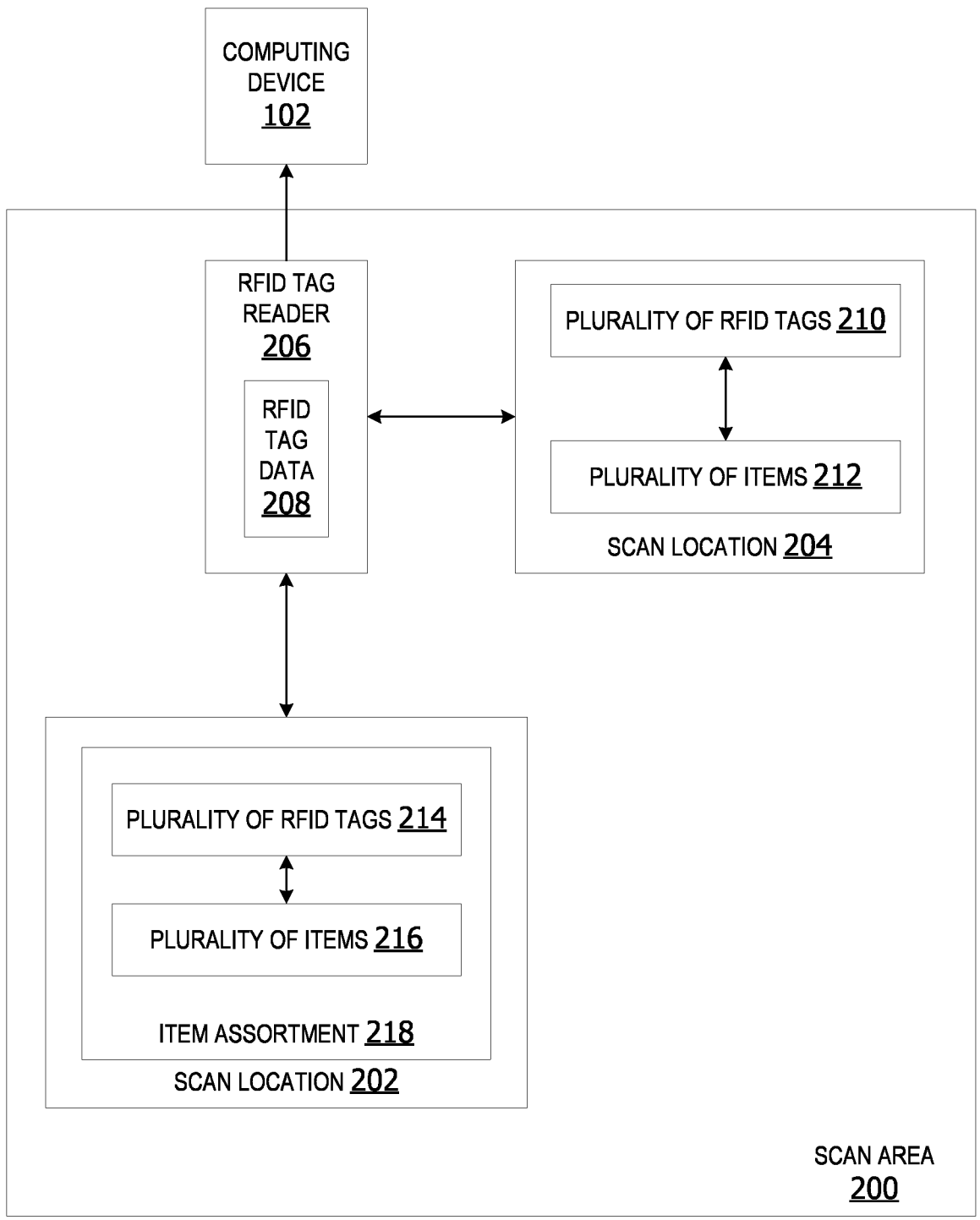
FIG. 2 is an exemplary block diagram illustrating a scan area including a plurality of scan locations.

FIG. 2 is an exemplary block diagram illustrating a scan area 200 including a plurality of scan location. In some examples, the scan area 200 includes a first scan location 202 and a second location 204. However, the examples are not limited to two scan locations within a scan area 200. The scan area can include any number of sub-locations. For example, the scan area can include three or more scan locations. A scan location is a sub-area or sub-location within the scan area 200. In some examples, the scan location is a modular display or a portion of a modular display. In other examples, the scan location is a subdivided area within the scan area, such as, but not limited to, a four foot by four-foot square area. A scan location can also include aisles or portions of an aisle in a store, slot locations in a DC, bins in an order fulfilment center or pick area, etc. Scan locations can be identified using rack and shelf identifiers, aisle location numbers, slot identification numbers, or any other location identification data.

An RFID tag reader 206 obtains RFID tag data 208 from a plurality of RFID tags 210 attached to a plurality of items 212 associated with the scan location 204. The RFID tag reader 206 is a scanning device, such as, but not limited to, the RFID tag reader 120 in FIG. 1. The RFID tag reader 206 also obtains RFID tag data 208 from a plurality of RFID tags 214 associated with a plurality of items 216 within an item assortment 218 assigned to the scan location 202. The RFID tag reader transmits the RFID tag data to a computing device, such as, but not limited to, the computing device 102 for analysis. In other examples, the RFID tag data is sent to a cloud server for analysis.

Figure 3:
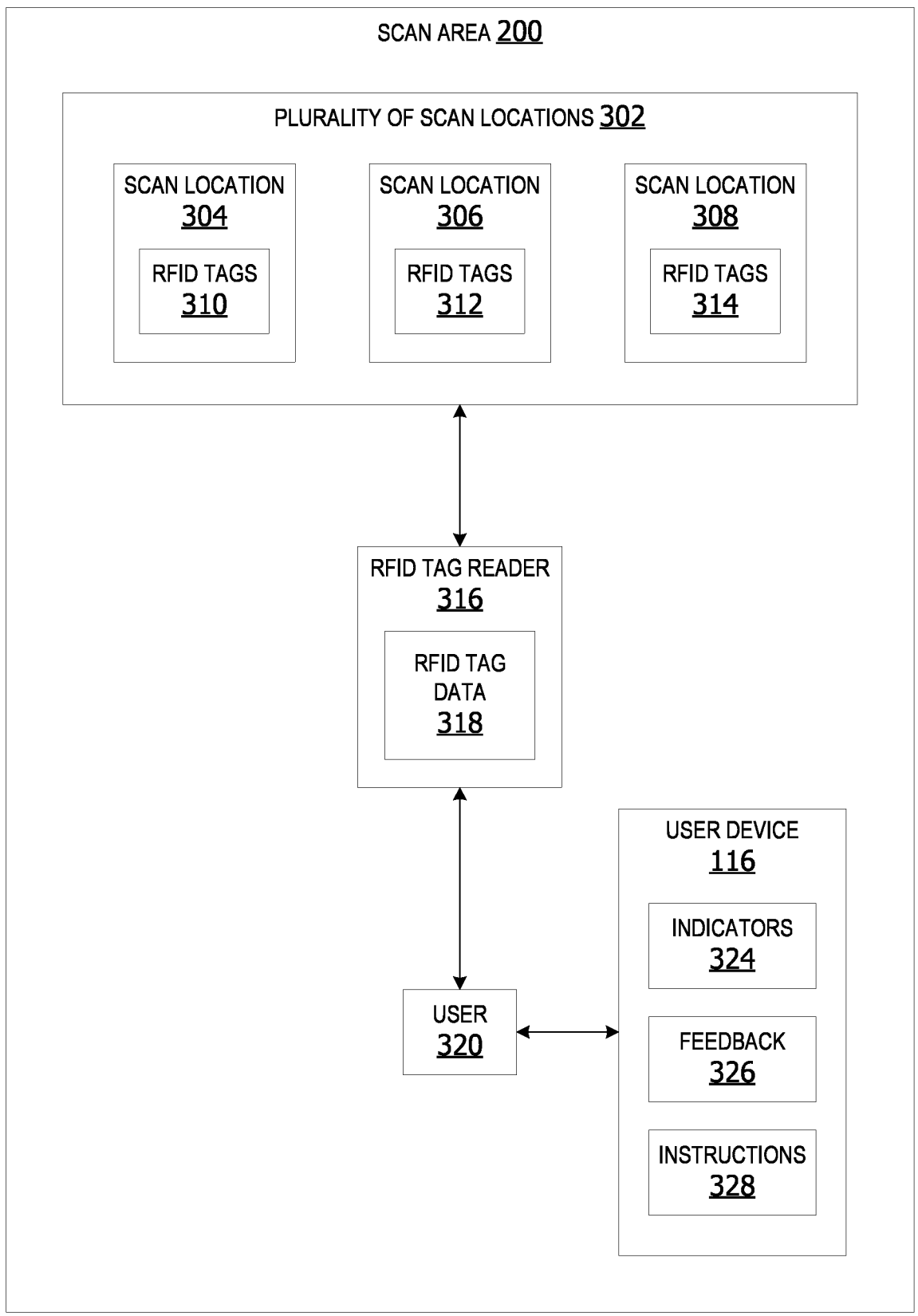
FIG. 3 is an exemplary block diagram illustrating a scan area including a plurality of RFID tags within the plurality of scan locations.

FIG. 3 is an exemplary block diagram illustrating a scan area 200 including a plurality of RFID tags within the plurality of scan locations 302. In this non-limiting example, the plurality of scan locations 302 includes a scan location 304, a scan location 306 and a scan location 308. However, the examples are not limited to three scan locations. In other examples, the scan area 200 includes four or more scan locations.

Each scan location includes items with RFID tags attached to the items. The items may be located on a modular display or a portion of a modular display. A modular display is any type of fixture or support structure for supporting, storing and/or displaying one or more items. A modular display can include, without limitation, a shelf, cart, buggy, rack, end-cap display, side counter, refrigerated display, freezer display, a deli counter, a warming cabinet, a produce bin, a cubby, a tote, or any other type of display.

In this non-limiting example, the scan location 304 includes one or more RFID tags 310 attached to one or more items within the scan location 304. The scan location 306 includes one or more RFID tags 312 attached to one or more items within the scan location 306. The scan location 308 includes one or more RFID tags 314 attached to one or more items within the scan location.

The RID tag data 318 is gathered from the RFID tags 310, the RFID tags 312 and/or the RFID tags 314. The RFID tag reader 316 pushes the RFID tag data 318 to a computing device for analysis. The computing device can include a computing device, such as, but not limited to, the computing device 102 in FIG. 1 and FIG. 2.

The user device 116 is a device associated with the user 320 conducting the scans of the RFID tags using the RFID tag reader 316. The user device displays indicators 324 associated with the scans of the RFID tags within the scan area 200. In some examples, the indicators 324 include graphical icons representing each scan location within the plurality of scan locations 302. A status indicator for each scan location indicates whether the scan of the scan location is complete, in-progress or has not yet begun.

In other examples, the indicators 324 include accuracy indicators that indicate whether a scan was accurate. An accuracy indicator can indicate that a scan is completed successfully, is incomplete/partially incomplete, and/or an indicator identifying a scan of a scan location as unsuccessful. An unsuccessful scan is a scan that failed to detect a minimum threshold number of RFID tags corresponding to the expected population of items for the scan location.

The user device 116 provides feedback 326 to the user 320 as the user is conducting the scans of the items within the scan locations. The feedback can include visual feedback, audio (audible) feedback, as well as haptic feedback. The visual feedback can include icons or graphics, such as, checkmarks, highlighting, colors, or other graphics indicating a successful scan. The visual feedback can also include text feedback indicating whether a scan is complete, incomplete, in-progress, or not yet begun.

The audio feedback, in some examples, can include sounds indicating positive or negative feedback. Positive audio feedback can include, for example, popping sounds indicating a scan in progress, the sounds of coins dropping indicating a scan in progress, the sound of clapping or a bell indicating a completed scan, etc.

The user device 116 can further output to the user instructions 328 received from the accuracy component. The instructions 328, in some examples, include instructions directing the user to a next location for scanning items, instructions directing the user 320 to rescan a scan location which shows a discrepancy between the expected population of items and the actual detected items identified using the RFID tag data.

Figure 4:
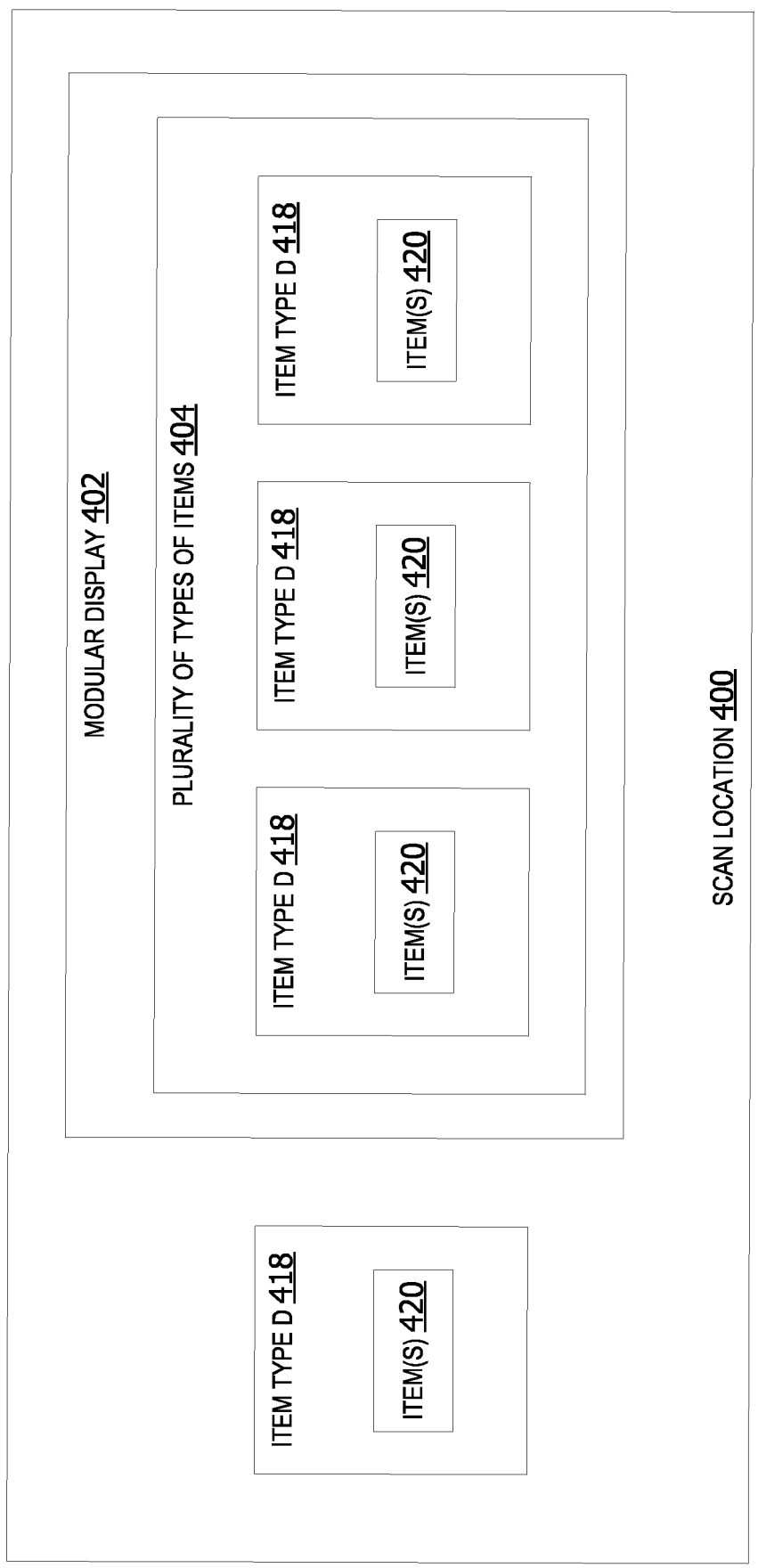
FIG. 4 is an exemplary block diagram illustrating a scan location including an assortment of items.

FIG. 4 is an exemplary block diagram illustrating a scan location 400 including an assortment of items. The scan location 400 is a sub-location within the scan area including a modular display 402. The modular display 402 includes a plurality of types of items 404 assigned to the modular display 402. The types of items distinguish items based on kind of item, variety of item, brand, size, item count per package, and other differences. For example, one type of item may include size medium shirt and another type of item is a size large of the same shirt. In other examples, one type of item may be dresses and another type of item may be skirts.

The plurality of items, in this example, is an item type A 406 including one or more item(s) 408, an item type B 412 including one or more item(s) 410, and/or an item type C 416 including one or more items(s) 414. Each item type A, item type B and item type C are different types of items in an item assortment located on the modular display 402 or a portion of the modular display 402. The scan location 400 can also include one or more items not located on a modular display or portion of a modular display. In this example, item(s) 420 of item type D 418.

In this non-limiting example, the assortment of items associated with the scan location 400 includes four types of items, item type A, item type B, item type C and item type D. However, the examples are not limited to four types of items in an assortment. In other examples, the item assortment can include two or more different types of items.

Figure 5:
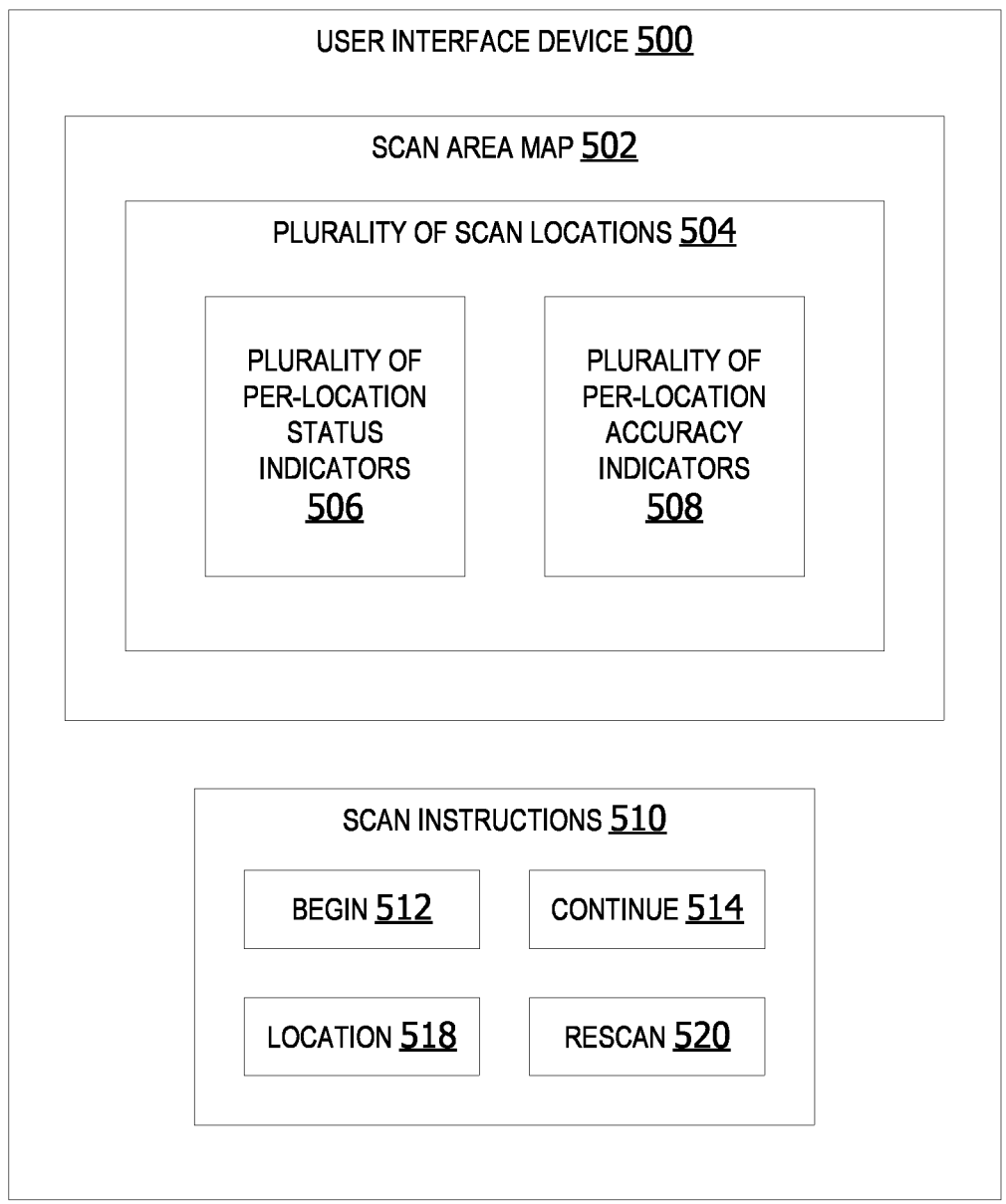
FIG. 5 is an exemplary block diagram illustrating a user interface device displaying a scan area map associated with a scan area.

FIG. 5 is an exemplary block diagram illustrating a user interface device 500 displaying a scan area map 502 associated with a scan area. In this example, the user interface device 500 is a user interface device associated with a computing device, such as, but not limited to, the computing device 102 and/or the user device 116.

The scan area map 502 is a map of the scan area displayed on the user interface device 500. The scan area map 502 includes graphical representation of each scan location in the plurality of scan locations 504 within the scan area. The graphical representations of each scan location, in some examples, includes a plurality of per-location status indicators 506. Each status indicator in the plurality of per-location status indicators includes an indicator that identifies whether a scan of each location in the plurality of scan locations is complete, in-progress or not yet begun (no scan).

In other examples, the scan area map 502 includes a plurality of per-location accuracy indicators 508. An accuracy indicator is a graphical icon within the user interface that indicates whether a scan of items within a given scan location was completed successfully or unsuccessfully. A successfully completed scan is a scan which obtains data associated with RFID tags matching the expected population of items for the given scan location within a user-configured threshold confidence level. The threshold confidence level indicates the percentage accuracy of the scan. In other words, if the user-configured threshold confidence level is ninety percent (90%), the scan is completed successfully if the scan detects ninety percent of the expected population of item types and/or number of items within each item type. In other examples, the user-configurable is seventy-five percent, eighty percent, ninety-five percent, or any other user-configurable value.

In some examples, the user interface device 500 presents scan instructions 510 generated by the accuracy component and transmitted to the user interface device 500 by the computing device hosting the accuracy component. The scan instructions 510 include instructions to the user performing the scan with a scan device, such as, but not limited to, and RFID tag reader wand. The instructions in some examples include an instruction to begin 512 a scan in a given location 518 and/or continue 514 a scan which is in-progress that has not yet detected the threshold level of expected types of items in the given location.

In other examples, the instructions 510 can include directions to a user to re-scan 520 a given scan location. A rescan instruction is output to the user in response to a failure to detect the expected population of items in the selected location. The rescan instruction may also be transmitted to the user interface device 500 in response to detected items identified using RFID tag data indicating a discrepancy between the detected types of items and the expected population of items.

Figure 6:
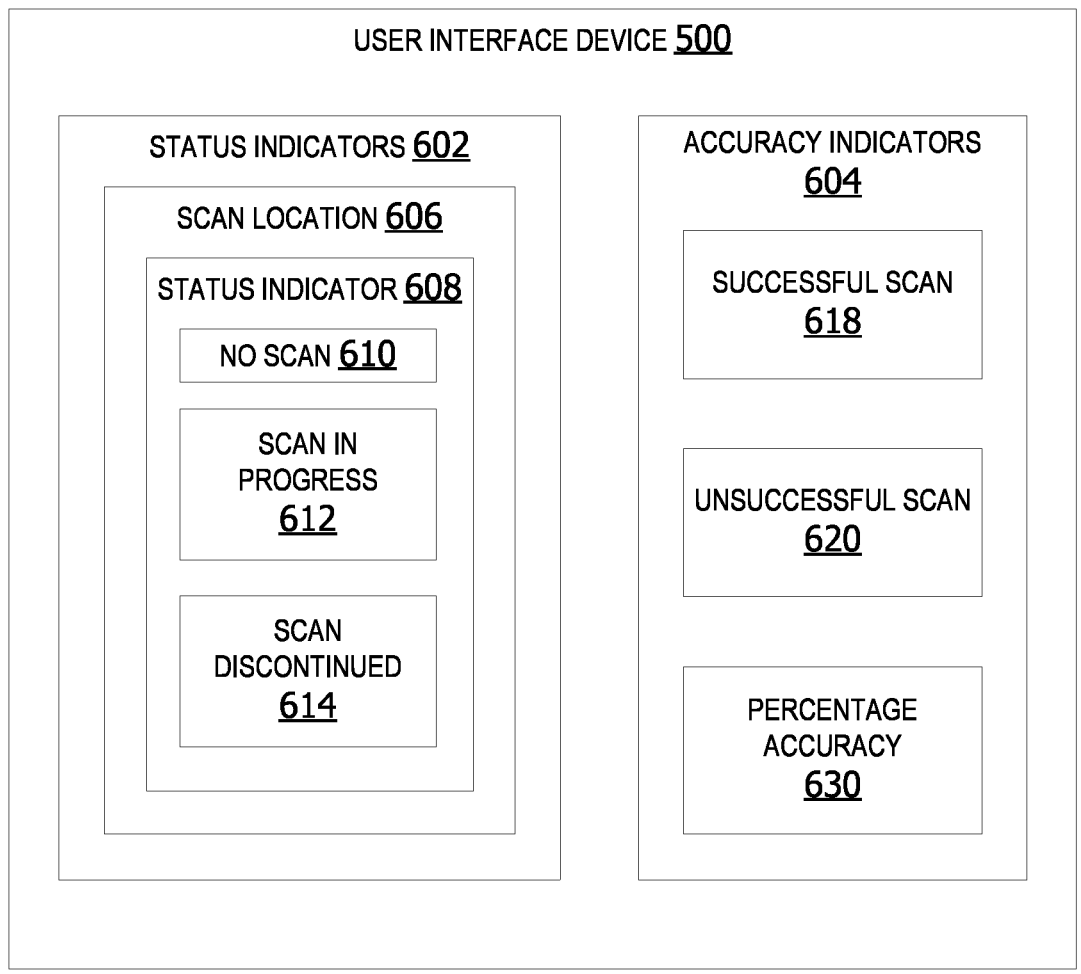
FIG. 6 is an exemplary block diagram illustrating the user interface device including scan location indicators and accuracy indicators associated with a plurality of scan locations.

Referring now to FIG. 6, an exemplary block diagram illustrating the user interface device 500 including status indicators 602 and/or accuracy indicators 604 associated with a plurality of scan locations is shown. In some examples, the status indicators 602 include one or more per-location graphical indicators identifying a status of each scan associated with each scan location in the plurality of locations. In this example, the status indicators 602 are associated with a scan location 606.

The status indicator 608, in some examples, a no scan 610 indicator is associated with a location in which the scan has not yet begun. A scan in progress 612 indicator indicates the scan for the given scan location 606 is currently in progress. A scan discontinued 614 indicator indicates the scan was begun but was paused or stopped before the scan was successfully completed. A scan complete 616 indicator is associated with a scan location in which the scan is complete. A completed scan is a scan in which the detected item match the expected population of items. An exact match occurs if every type of item in the expected population of items is detected during the scan of the location. However, the examples do not require an exact match. If the system detects a threshold percentage of the types of expected types of items during the scan, the scan is determined to be complete. In other examples, if a threshold number of the types of items are detected during the scan, the scan is considered complete.

The accuracy indicators 604 indicates the accuracy of a scan. An accuracy indicator can include a successful scan indicator 618. A successful scan indicator identifies a scan location in which the expected item types were identified and/or a threshold percentage of item types were identified during the scan.

An unsuccessful scan 620 indicator identifies a scan location in which a discrepancy was detected between the detected items and the expected population of items. A discrepancy occurs if a difference between the detected items and the expected population of items is greater than a user-configured threshold. In other examples, a scan is unsuccessful if the percentage accuracy 630 of the score is below the threshold.

An unsuccessful scan can result in an instruction to the user to rescan the scan location 606, perform an alternate type of scan, make a manual verification of the items in the location, and/or reject updates to on-hand inventory due to the discrepancy.

Figure 7:
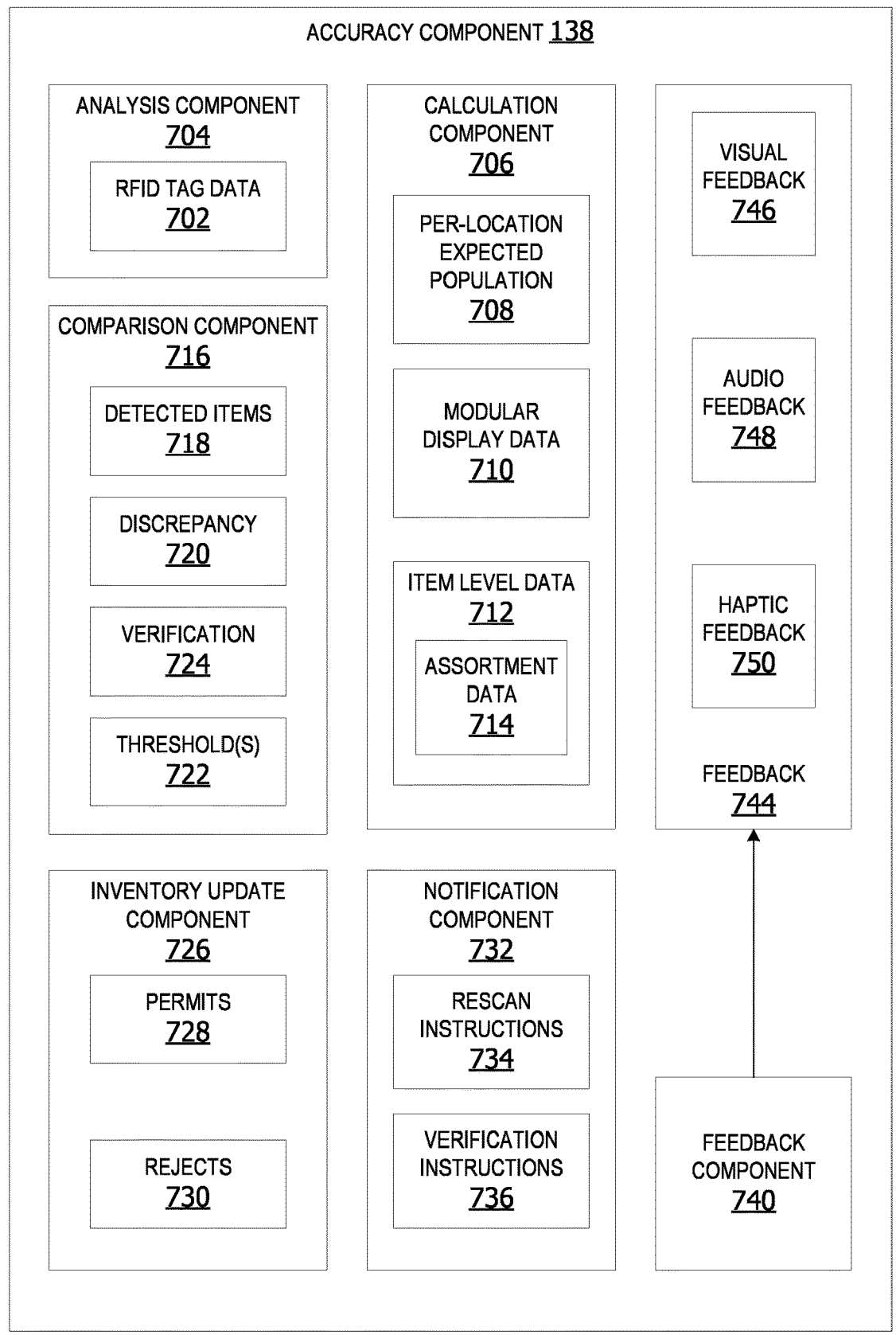
FIG. 7 is an exemplary block diagram illustrating an accuracy component for performing scan accuracy using RFID tag data.

FIG. 7 is an exemplary block diagram illustrating an accuracy component 138 for performing scan accuracy using RFID tag data 702. An analysis component 704 analyzes the RFID tag data 702 to identify one or more detected items 718 within the selected scan location. In some examples, the analysis component compares item identification data obtained from the RFID tag data with known RFID tag data to identify items within the item location.

In other examples, a calculation component 706 calculates a per-location expected population 708 of items associated with the selected scan area using modular display data 710 and item level data 712. The modular display data 710 is data describing the scan location. The modular display data 710 can include data describing the size/area of the scan location, type of modular display, available display space, number of items which can fit within the modular display, and any other relevant data associated with the display.

The item level data 712 includes assortment data 714. The assortment data 714 describes the types of items assigned to the scan location and/or the number of each type of item. Each scan location in the scan area has a unique expected population of items. The expected population of items is constructed on a per-store and per-location basis.

A comparison component 716, in some examples, compares the expected population 708 of items with the detected items 718 identified using the RFID tag data 702. If the detected items 718 match the expected assortment of items, an inventory update component 726 permits 728 an update of the on-hand inventory with the detected items 718 identified using the RFID tag data 702.

In other examples, if a discrepancy 720 is detected between the detected items 718 and the per-location expected population 708 of items, the inventory update component 726 rejects 730 any attempted update of the inventory data using the detected items 718.

In some examples, if a discrepancy is detected, a notification component 732 outputs a rescan instruction 734 instructing a user to perform a rescan of the location. A rescan occurs when the user returns to the selected scan location and rescans the items using the RFID tag reader device. If the rescan results match the expected population of items, the inventory update component 726 permits the inventory data to be updated using the RFID tag data 702.

In other examples, if the rescan results continue to show the discrepancy, the notification component 732 generates a verification instruction 736 instructing the user to perform a verification 724 of the items on the display. The verification can be performed by manually counting the items, scanning the items using an alternative type of scanning, using other data such as nil pick data, etc. An alternative scan method can include scanning barcodes, such as universal product codes (UPCs) or matrix barcodes. A nil pick occurs when a customer attempts to locate an item and fails. The report of the customer's inability to locate the item (item out) is reported as a nil pick.

A feedback component 740 in other examples provides feedback to the user prior to beginning the scan, during scanning and/or at the conclusion of a scan of at least one scan location. The feedback 744 can include visual feedback 746, audio feedback 748 and/or haptic feedback 750.

Figure 8:
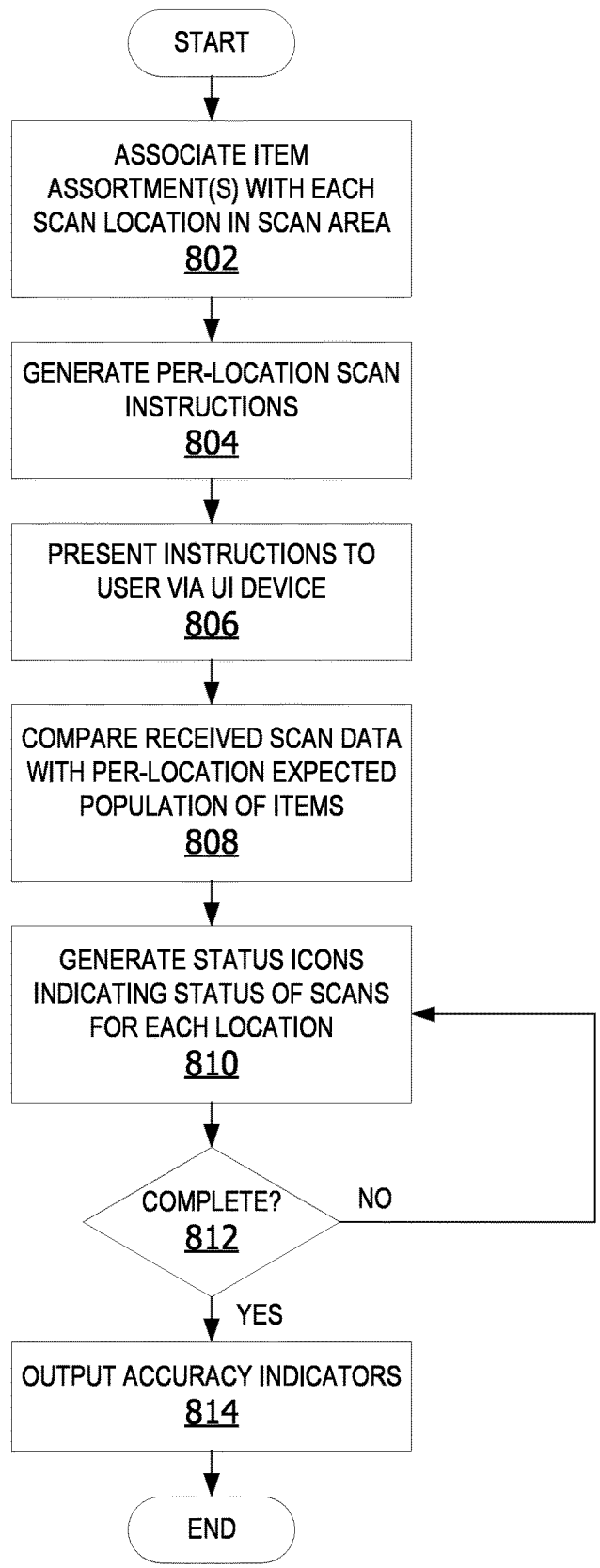
FIG. 8 is an exemplary flow chart illustrating operation of the computing device to providing feedback to a user during scanning.

FIG. 8 is an exemplary flow chart illustrating operation of the computing device to providing feedback to a user during scanning. The process shown in FIG. 8 is performed by an accuracy component, executing on a computing device, such as the computing device 102 or the user device 116 in FIG. 1.

The process begins associating item assortment(s) with each scan location in a scan area at 802. A scan area is a location that is subdivided into a plurality of sub-locations, such as, but not limited to, the scan area 200 in FIG. 2. Per-location scan instructions are generated at 804. The instructions are presented to the user via a user interface device at 806. The user interface is a device, such as, but not limited to, the user interface device 110 in FIG. 1 and/or the user interface device 500 in FIG. 5. The received scan data is compared with per-location expected population of items at 808. Status icons indicating status of the scans for each location in the scan area are generated at 810. A determination is made whether the scans for all the locations within the scan area are complete at 812. If yes, accuracy indicators for each location are output at 814. The process terminates thereafter.

In the example shown in FIG. 8, the accuracy indicators are output after all the sub-locations within the scan area are complete. In other examples, accuracy indicators are generated and output to the user as each sub-location is generated. Thus, if only some of the sub-locations have been scanned but others have not been scanned, the user interface displays accuracy indicators for the completed scans and status indicators showing no scan has been performed yet on the other sub-locations is shown.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
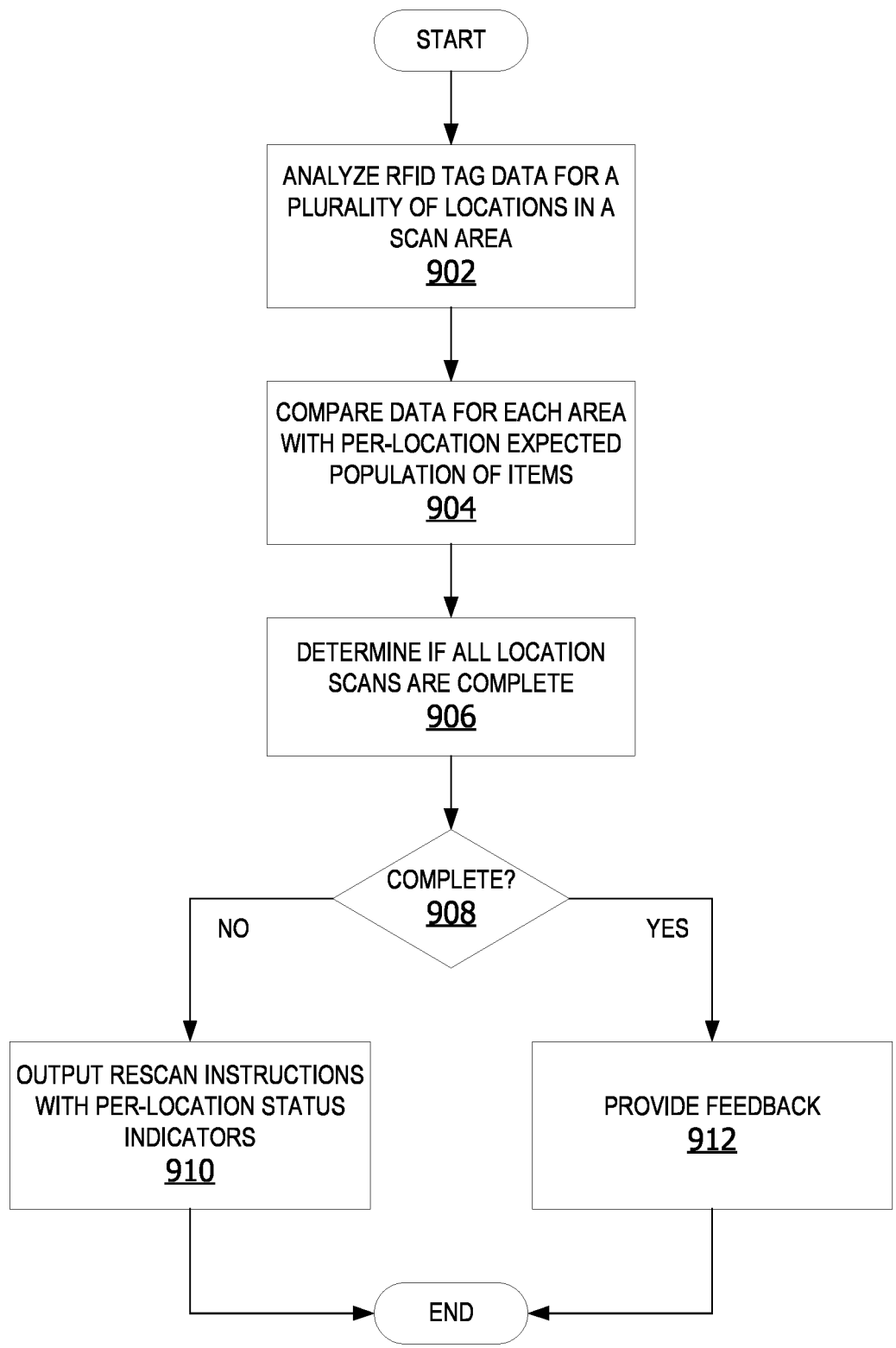
FIG. 9 is an exemplary flow chart illustrating operation of the computing device to perform on-hand inventory accuracy using RFID tag data.

FIG. 9 is an exemplary flow chart illustrating operation of the computing device to perform on-hand inventory accuracy using RFID tag data. The process shown in FIG. 9 is performed by an accuracy component, executing on a computing device, such as the computing device 102 or the user device 116 in FIG. 1.

The process begins by analyzing RFID tag data for a plurality of locations in a scan area at 902. The RFID tag data is data generated by an RFID tag reader, such as, but not limited to, the RFID tag reader 120 in FIG. 1. Data for each area is compared with per-location expected population of items at 904. A determination is made whether all the location scans for all the sub-locations is complete at 906. If no, rescan instructions are output with pre-location status indicators identifying which sub-locations need to be scanned for the first time or rescanned at 910. If the scans are all complete, the system provides feedback at 912. The feedback indicates whether the scans were completed successfully. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Figure 10:
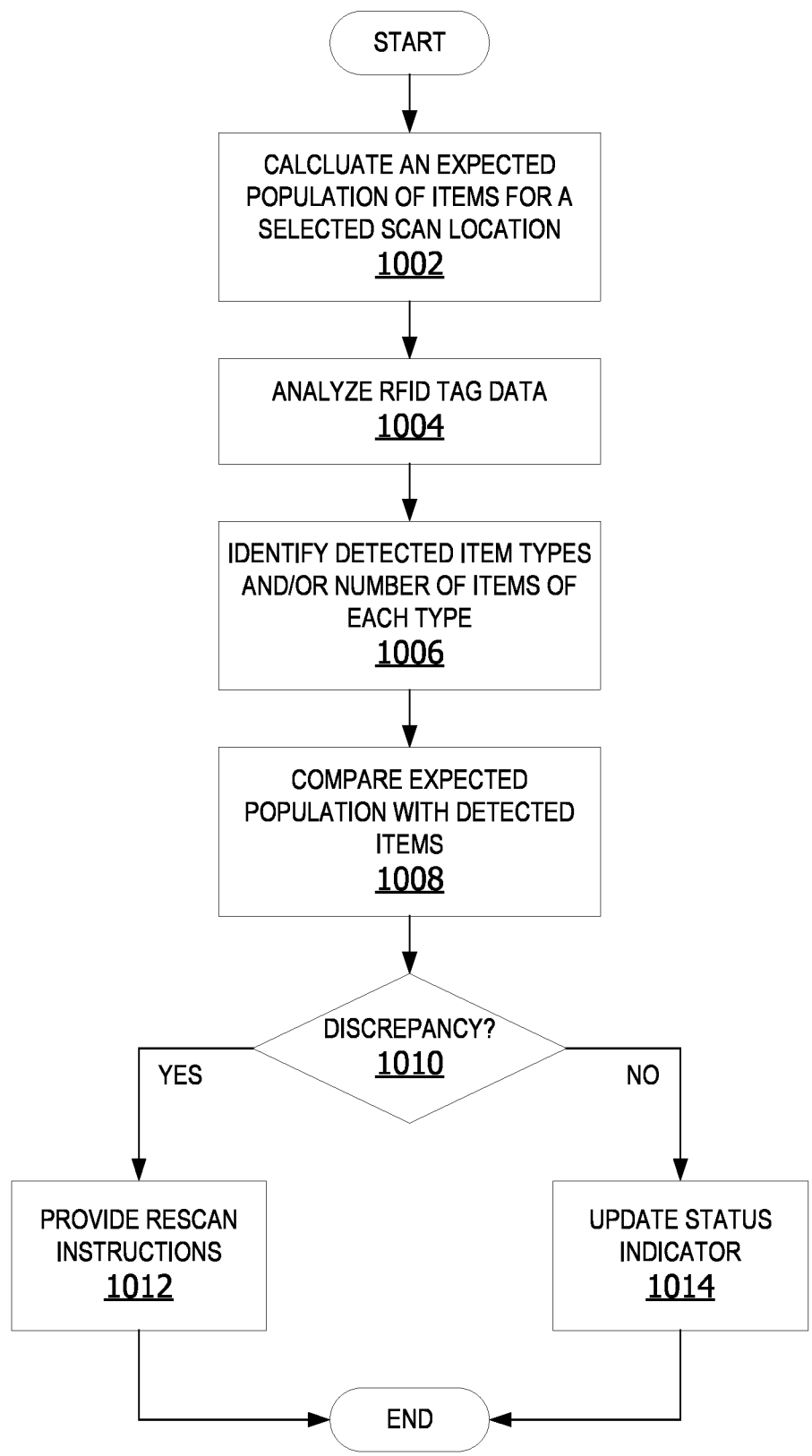
FIG. 10 is an exemplary flow chart illustrating operation of the computing device to determine accuracy of RFID scan results.

FIG. 10 is an exemplary flow chart illustrating operation of the computing device to determine accuracy of RFID scan results. The process shown in FIG. 10 is performed by an accuracy component, executing on a computing device, such as the computing device 102 or the user device 116 in FIG. 1.

The process calculates an expected population of items for a selected scan location at 1002. RFID tag data is analyzed at 1004. In some examples, the RFID tag data is analyzed by an analysis component, such as, but not limited to, the analysis component 704 in FIG. 7. The detected item types and/or number of items of each type are identified at 1006. The expected population of items is compared with the detected items at 1008. A determination is made whether a discrepancy exists between the expected population of items and the detected items at 1010. If yes, rescan instructions are provided to the user at 1012. If no discrepancy is found, the status indicator is updated to show an accurate scan is completed at 1014. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
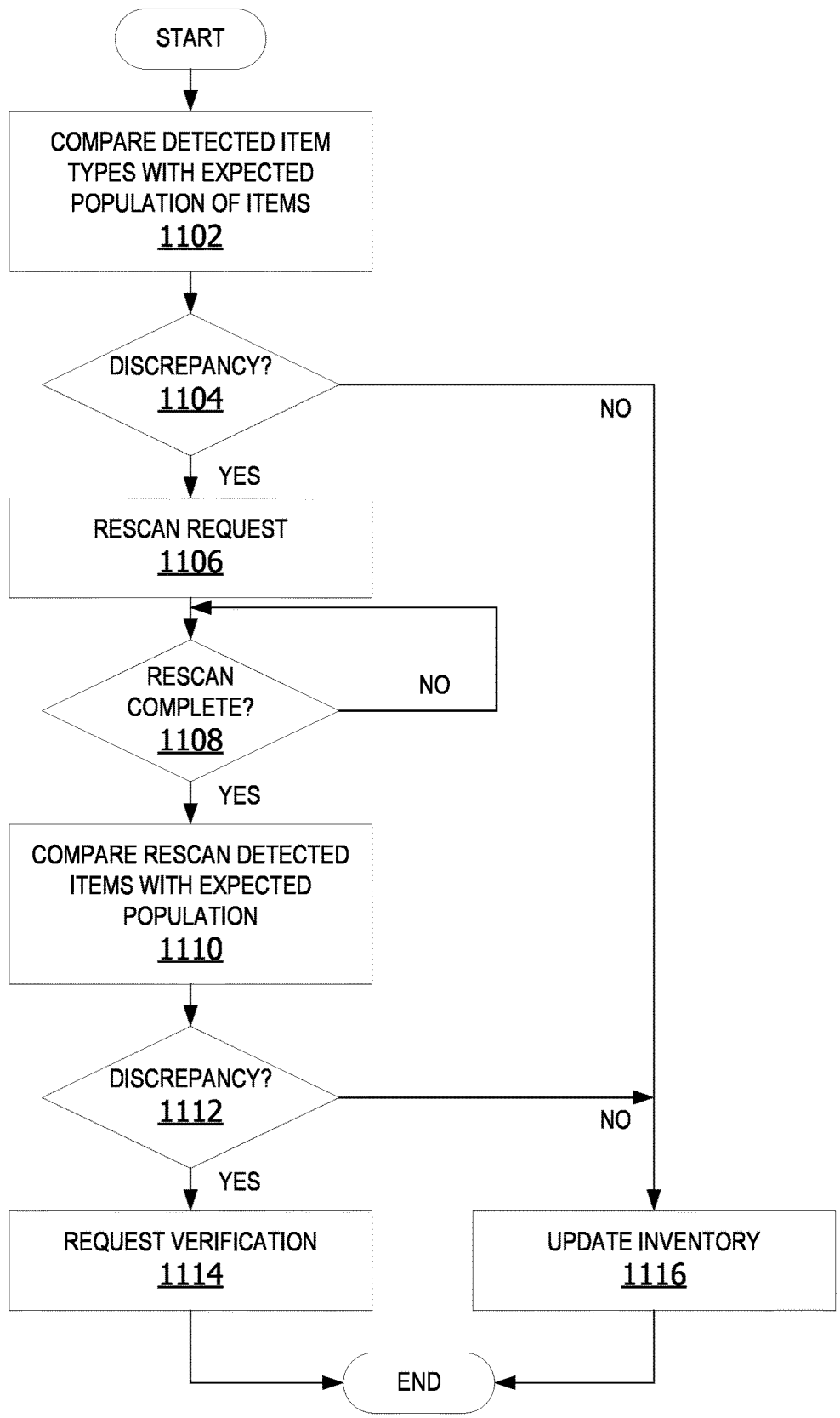
FIG. 11 is an exemplary flow chart illustrating operation of the computing device to handle discrepancies in RFID tag data.

FIG. 11 is an exemplary flow chart illustrating operation of the computing device to handle discrepancies in RFID tag data. The process shown in FIG. 11 is performed by an accuracy component, executing on a computing device, such as the computing device 102 or the user device 116 in FIG. 1.

The process begins by comparing detected types of items with the expected population of items at 1102. A determination is made whether a discrepancy exists at 1104. If yes, a rescan is requested at 1106. A determination is made whether the rescan is complete at 1108. If yes, the rescan detected items are compared with the expected population of items at 1110. A determination is made whether there is a discrepancy between the rescan detected items and the expected population of items at 1112. If yes, verification is requested at 1114. The verification can include a user manually recounting the items, scanning barcodes on the items, visually checking the items, or other forms of verification.

If no discrepancy if found at 1104 or 1112, inventory is updated using the detected items at 1116. The process terminates thereafter.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Figure 12:
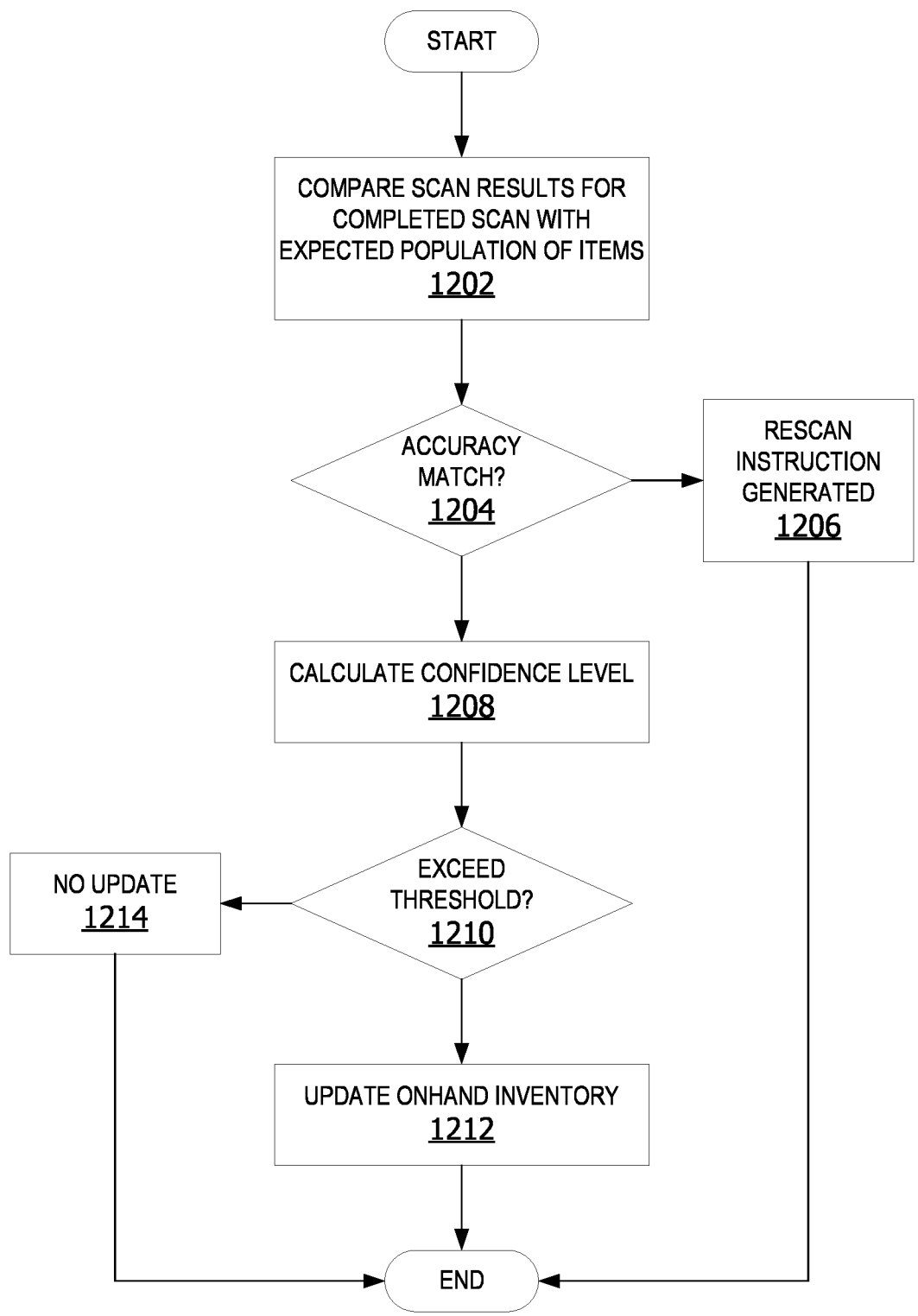
FIG. 12 is an exemplary flow chart illustrating operation of the computing device to control update of on-hand inventory based on RFID tag data accuracy.

FIG. 12 is an exemplary flow chart illustrating operation of the computing device to control update of on-hand inventory based on RFID tag data accuracy. The process shown in FIG. 12 is performed by an accuracy component, executing on a computing device, such as the computing device 102 or the user device 116 in FIG. 1.

The process begins by comparing scan results for completed scan with expected population of items at 1202. A determination is made whether there is an accuracy match at 1204. An accuracy match is found if the difference between the detected items and the expected population of items is within an accuracy threshold range. If the results are not within the threshold range, rescan instructions are generated at 1206. The process terminates thereafter.

Returning to 1204, if the results match the expected population of items within the confidence threshold indicating accuracy of the results, a confidence level is calculated at 1208. A determination is made whether the results are above the minimum confidence threshold level at 1210. If yes, the on-hand inventory is updated using the RFID tag data at 1212. If no, an update to the on-hand inventory is not performed at 1214. The process terminates thereafter.

While the operations illustrated in FIG. 12 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 12.

Figure 13:
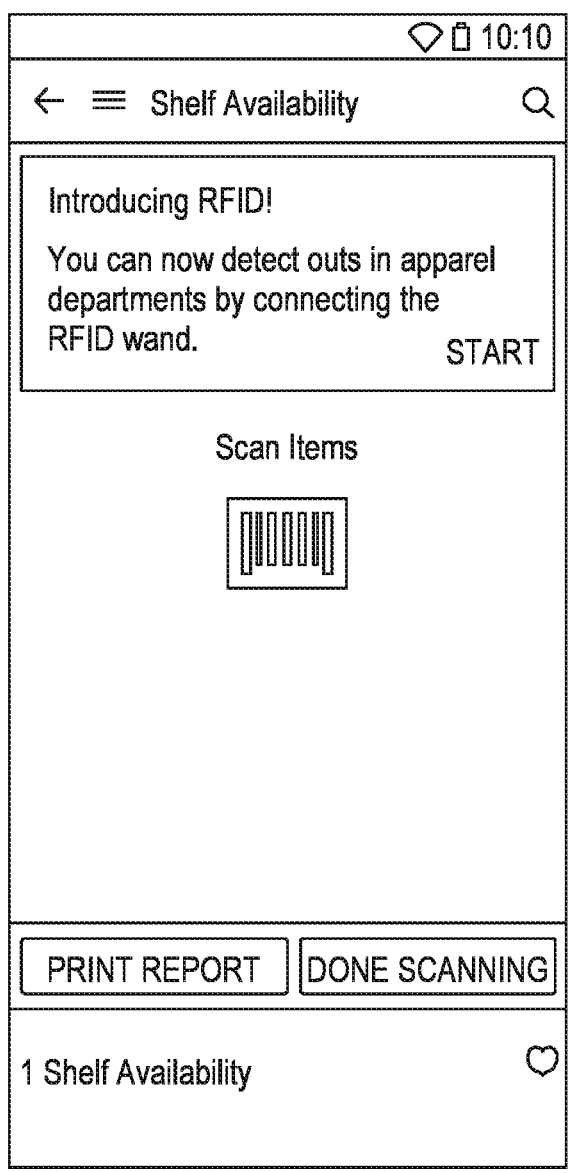
FIG. 13 is an exemplary screenshot illustrating an initial setup screen enabling a user to pair an RFID scanner device to the system for performance of a scan using the on-hand inventory accuracy system.

FIG. 13 is an exemplary screenshot 1300 illustrating an initial setup screen enabling a user to pair an RFID scanner device to the system for performance of a scan using the on-hand inventory accuracy system. In this non-limiting example, the screenshot 1300 is an initial display presented upon initiation of the on-hand inventory accuracy system for tracking scanning of departments using an RFID tag reader paired with a user device. In this example, an RFID tag reader is paired with the user device. In other examples, the RFID tag reader is incorporated into the user device.

Figure 14:
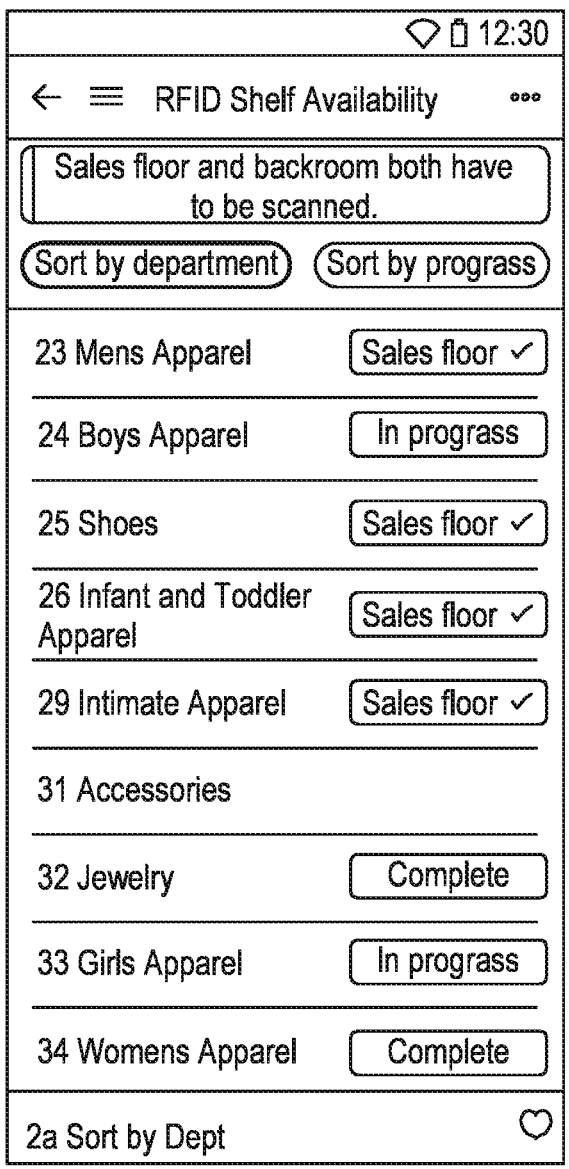
FIG. 14 is an exemplary screenshot illustrating a sort by department option enabling the user to sort scan areas by departments within a retail environment.

FIG. 14 is an exemplary screenshot 1400 illustrating a sort by department option enabling the user to sort scan areas by departments within a retail environment. When enabled, scan locations are listed by departments without regard to scan progress.

Figure 15:
FIG. 15 is an exemplary screenshot illustrating a sort by progress option sorting scan areas in accordance with scan progress for each scan area.

FIG. 15 is an exemplary screenshot 1500 illustrating a sort by progress option sorting scan areas in accordance with scan progress for each scan area. Each scan location is listed in accordance with scan progress. Locations which have not yet been scanned are listed first. Locations in which scans have begun but are not yet complete, are listed next. Locations in which scans are complete are listed last.

Figure 16:
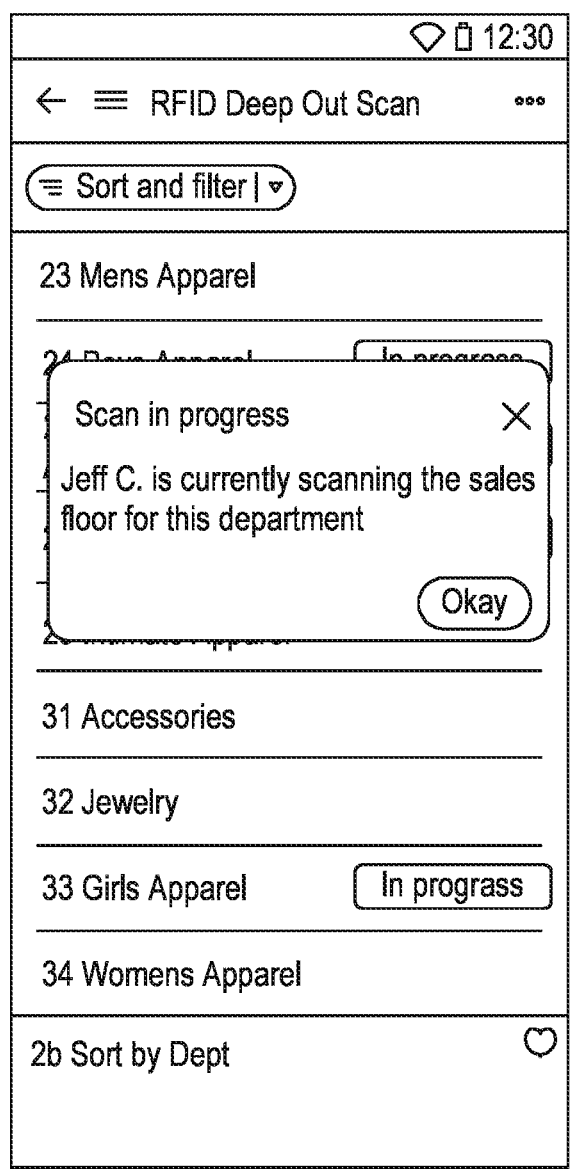
FIG. 16 is an exemplary screenshot illustrating an option providing additional information associated with each department.

FIG. 16 is an exemplary screenshot 1600 illustrating an option providing additional information associated with each department. In this example, when a department is selected, the system outputs an identification of the user performing the scan.

Figure 17:
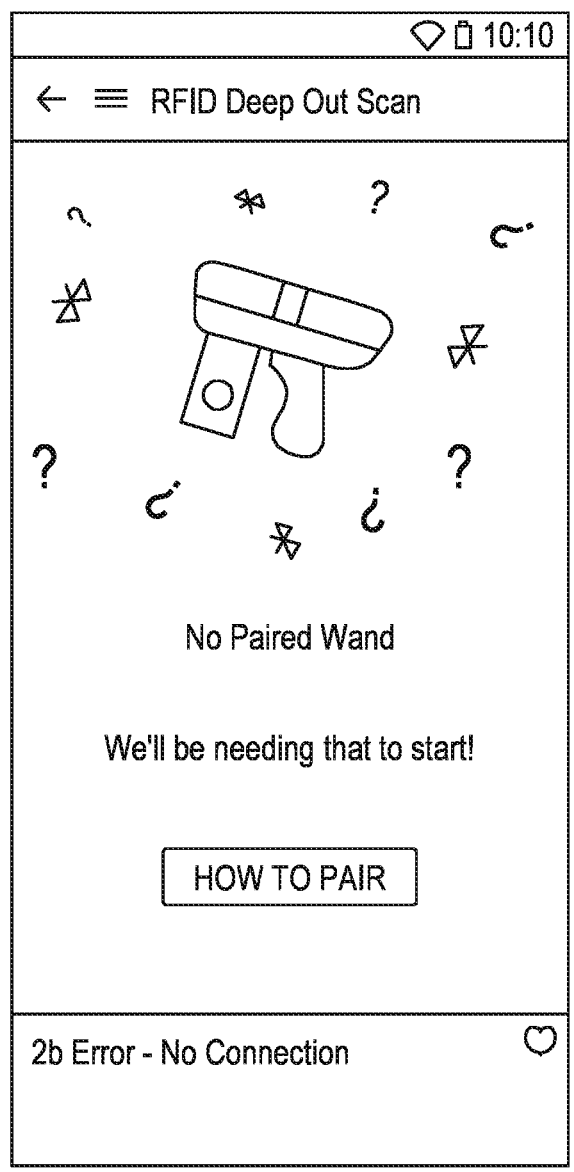
FIG. 17 is an exemplary screenshot illustrating a notification to pair an RFID scanner with a user device.

FIG. 17 is an exemplary screenshot 1700 illustrating a notification to pair an RFID scanner with a user device. If no RFID tag reader is paired with the user and/or user device, the system outputs the notification to connect/pair a reader. The user can select a how to pair icon to obtain more detailed instructions regarding how to connect/pair a reader with the user/user device.

Figure 18:
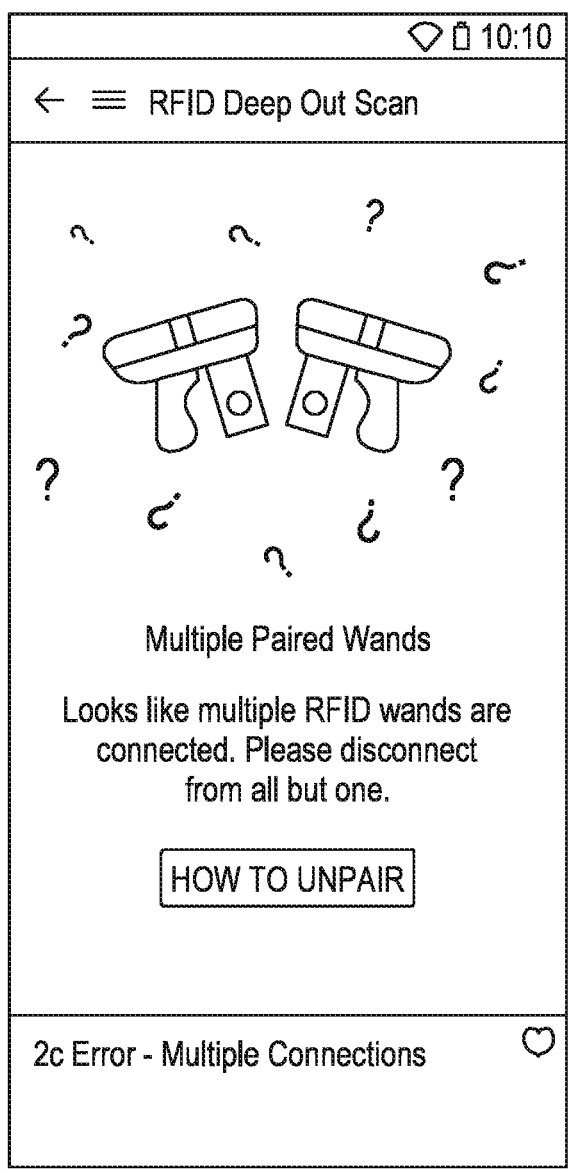
FIG. 18 is an exemplary screenshot illustrating notification instructing a user to unpair one or more RFID scanner devices.

FIG. 18 is an exemplary screenshot 1800 illustrating notification instructing a user to unpair one or more RFID scanner devices. If more than one scanner device, such as an RFID tag reader wand, is connected/paired with the user and/or user device, the notification is displayed. A user can select the how to unpair icon to obtain additional information for unpairing one or more RFID tag readers.

Figure 19:
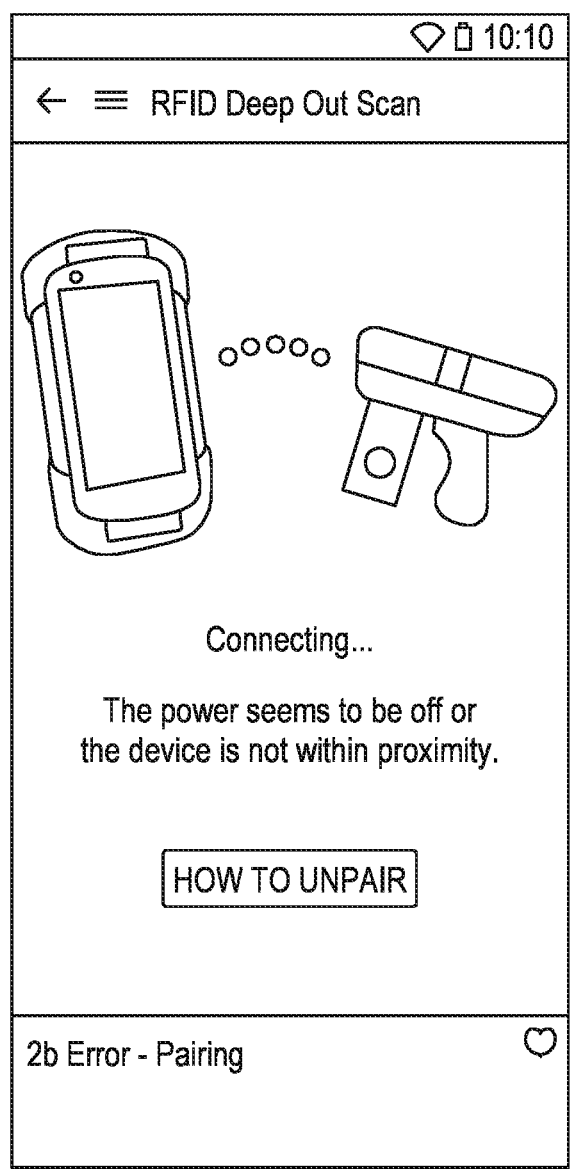
FIG. 19 is an exemplary screenshot illustrating an attempt to connect an RFID tag reader.

FIG. 19 is an exemplary screenshot 1900 illustrating an attempt to connect an RFID tag reader. A user can select an icon to obtain additional information to unpair an RFID tag reader device which is already connected.

Figure 20:
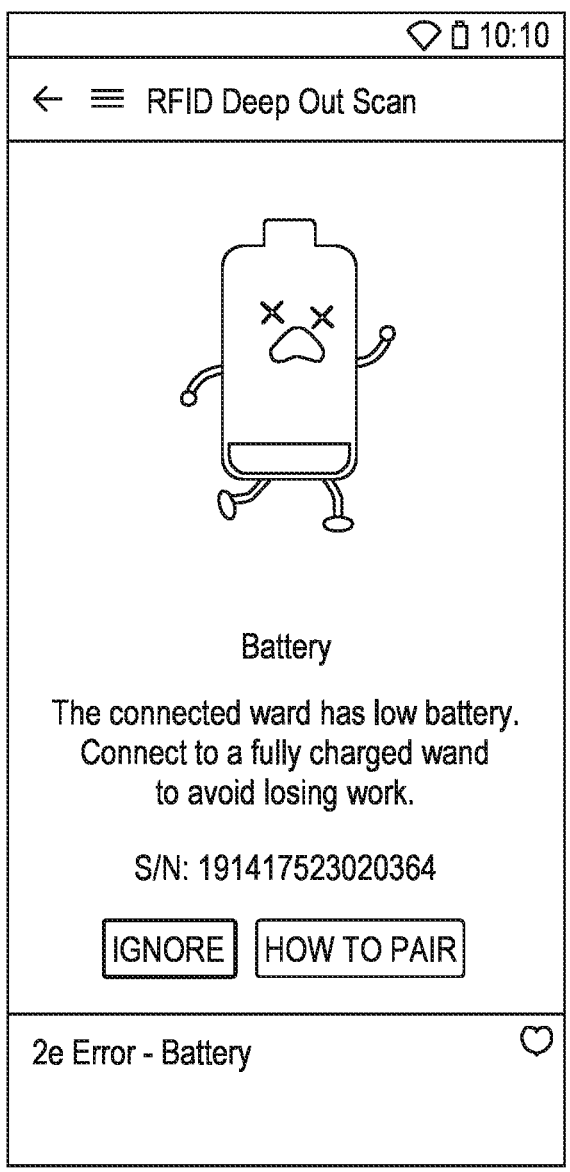
FIG. 20 is an exemplary screenshot illustrating a notification of a low RFID tag reader battery.

FIG. 20 is an exemplary screenshot 2000 illustrating a notification of a low RFID tag reader battery. The notification is presented when the system detects the signals generated by the RFID tag reader are weakening or other data associated with the RFID tag reader indicates one or more batteries in the RFID tag reader are weakening.

Figure 21:
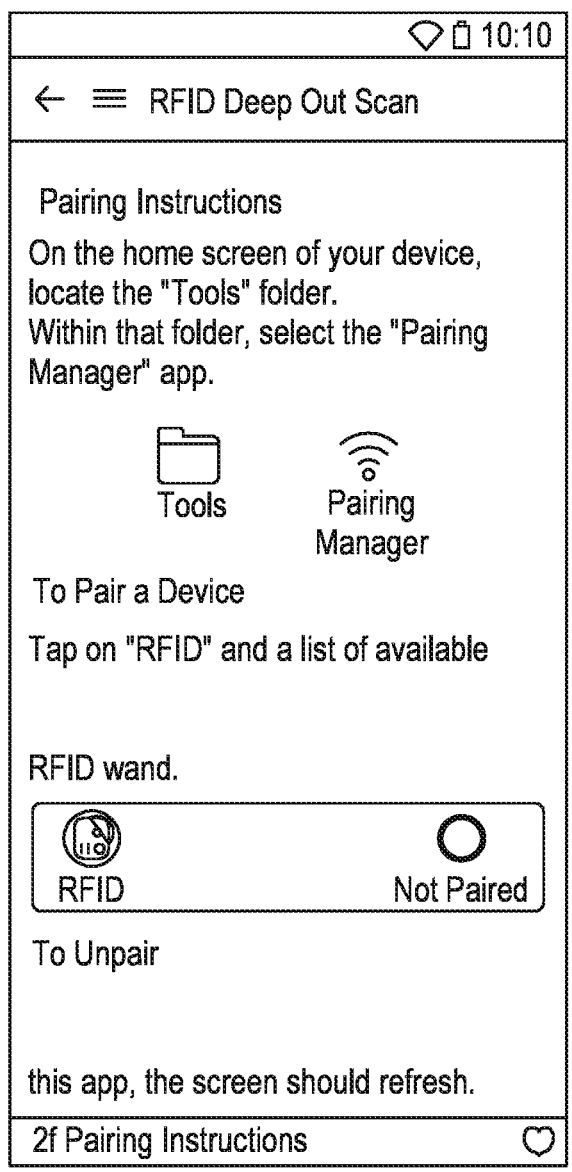
FIG. 21 is an exemplary screenshot illustrating instructions for pairing an RFID tag reader with a user device.

FIG. 21 is an exemplary screenshot 2100 illustrating instructions for pairing an RFID tag reader with a user device. The instructions are presented in response to a user selecting the how to pair icon, shown in FIG. 17 above.

Figure 22:
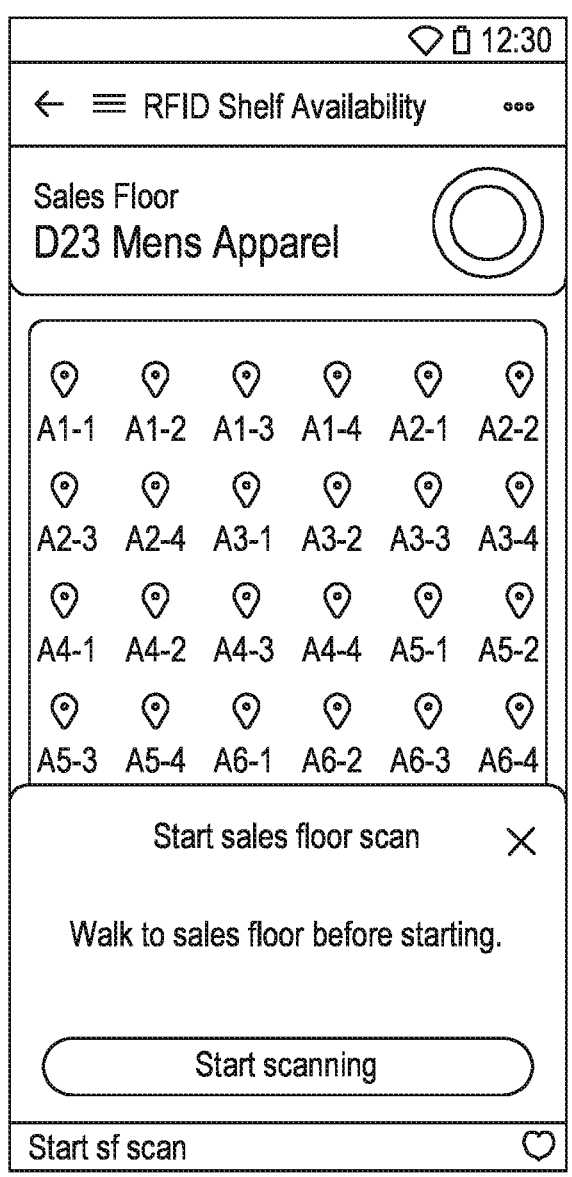
FIG. 22 is an exemplary screenshot illustrating scan instructions.

FIG. 22 is an exemplary screenshot 2200 illustrating scan instructions. The scan instructions include one or more instructions to a user associated with scanning a selected scan location. The selected scan location can include one or more sub-locations.

Figure 23:
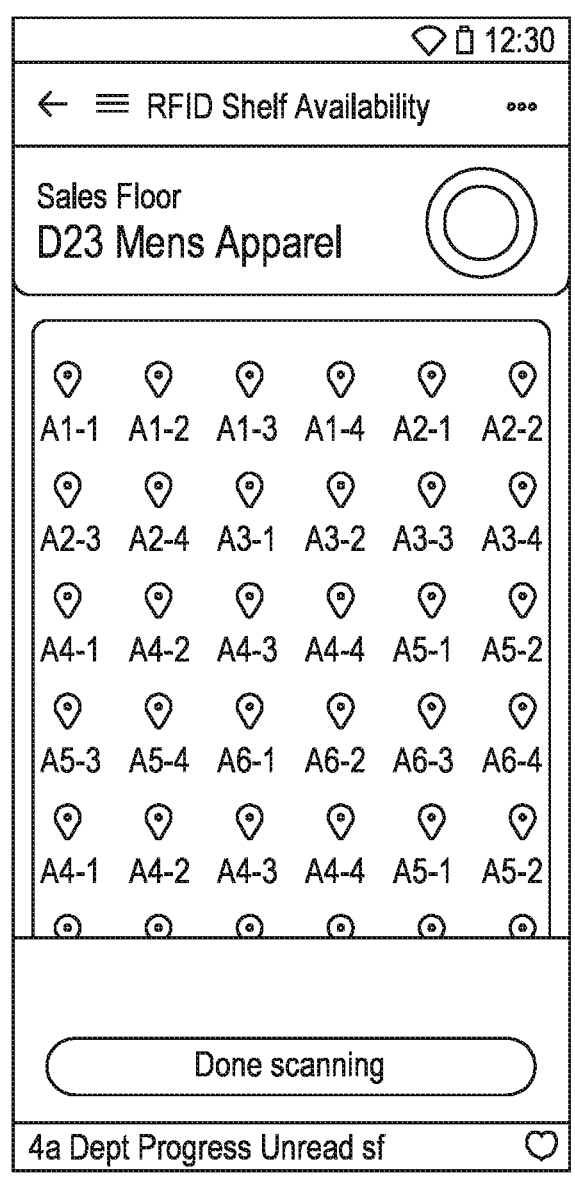
FIG. 23 is an exemplary screenshot illustrating a plurality of location icons representing a plurality of sub-locations within a selected scan location.

FIG. 23 is an exemplary screenshot 2300 illustrating a plurality of location icons representing a plurality of sub-locations within a selected scan location. Each location icon in the plurality of location icons represents a sub-location within the selected scan location.

Figure 24:
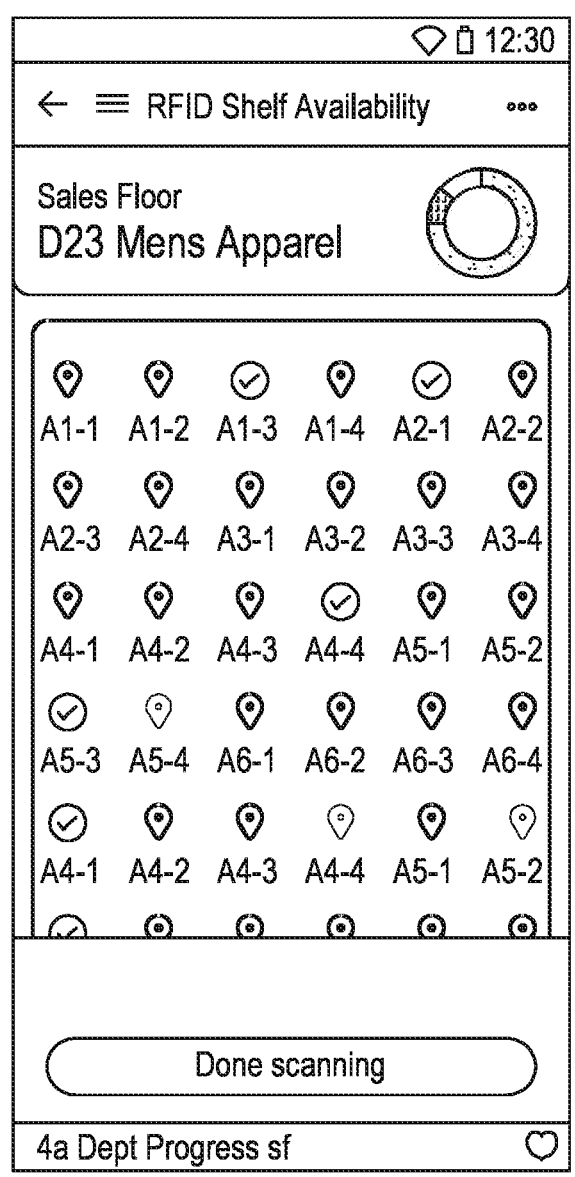
FIG. 24 is an exemplary screenshot illustrating a plurality of status indicators representing scan progress in a plurality of sub-locations.

FIG. 24 is an exemplary screenshot illustrating a plurality of status indicators representing scan progress in a plurality of sub-locations. Each status indicator indicates whether a scan of a given sub-location within the selected scan location has been completed successfully. In this example, a check mark superimposed over the sub-location icon. The location icons without the check mark have not yet been scanned or the scan is incomplete. An incomplete scan is a scan that has not yet detected the threshold number of expected items and/or item types.

Figure 25:
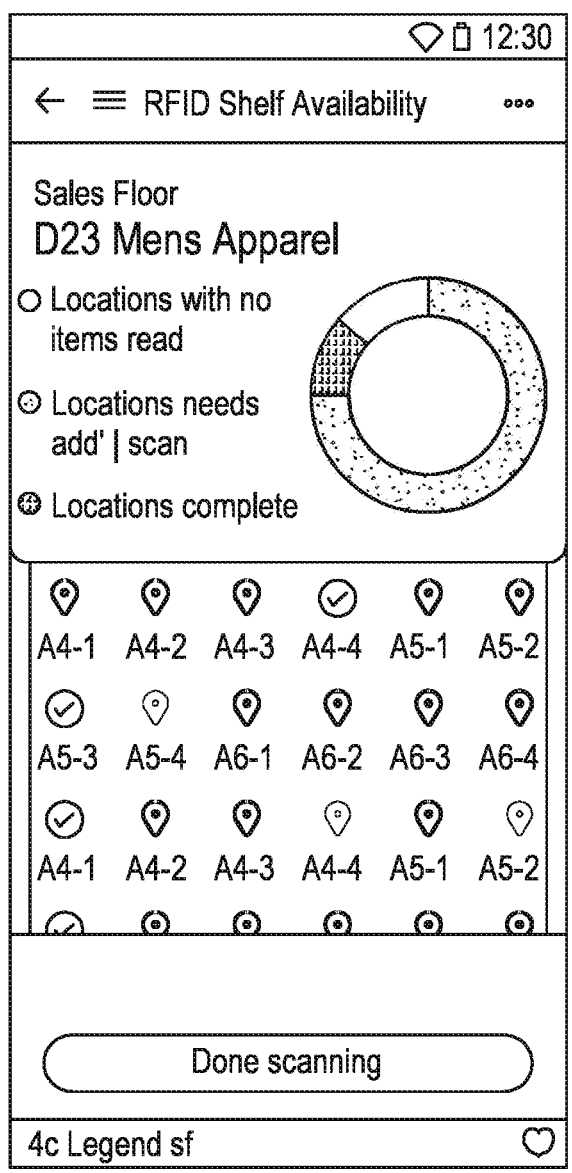
FIG. 25 is an exemplary screenshot illustrating an accuracy indicator and a plurality of status indicators.

FIG. 25 is an exemplary screenshot 2500 illustrating an accuracy indicator and a plurality of status indicators. The accuracy indicator in this non-limiting example is a ring. The accuracy indicator ring indicates a percentage or proportion of the sub-locations which have been scanned accurately (complete scan), inaccurately scanned (re-scan required) and/or sub-locations in which no scan data has been received yet.

Figure 26:
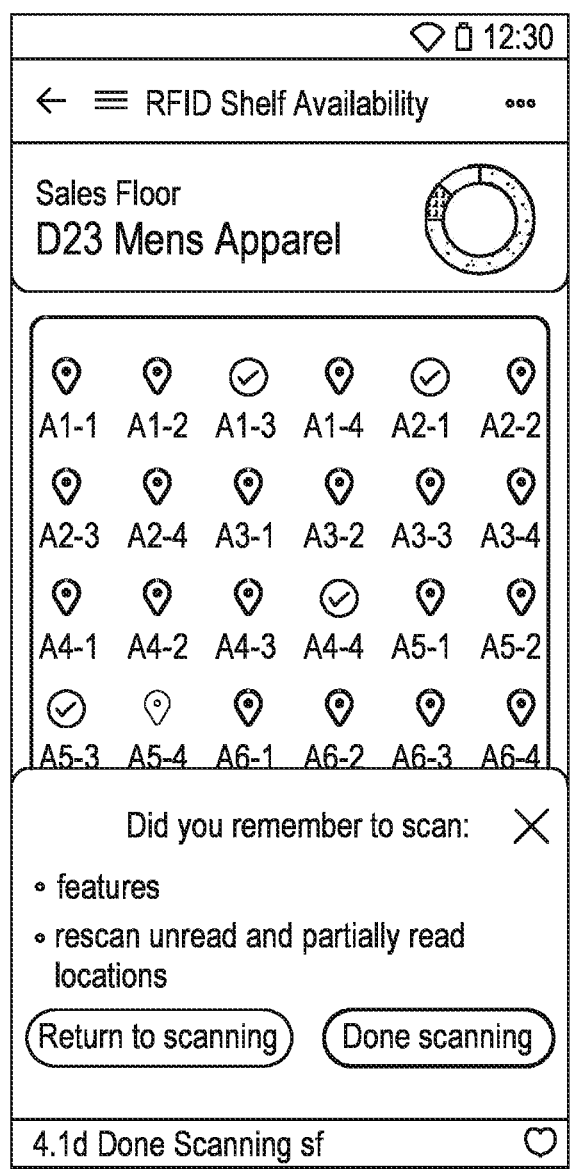
FIG. 26 is an exemplary screenshot illustrating re-scan instructions for one or more sub-locations within a selected scan location.

FIG. 26 is an exemplary screenshot 2600 illustrating re-scan instructions for one or more sub-locations within a selected scan location. The instructions includes directions for the user to rescan those sub-locations which were unsuccessfully scanned (insufficient items/item types detected) and/or scan those areas for which no scan data was received (no items detected). The re-scan instructions direct users to rescan areas in which the threshold number of expected number of items were not detected.

Figure 27:
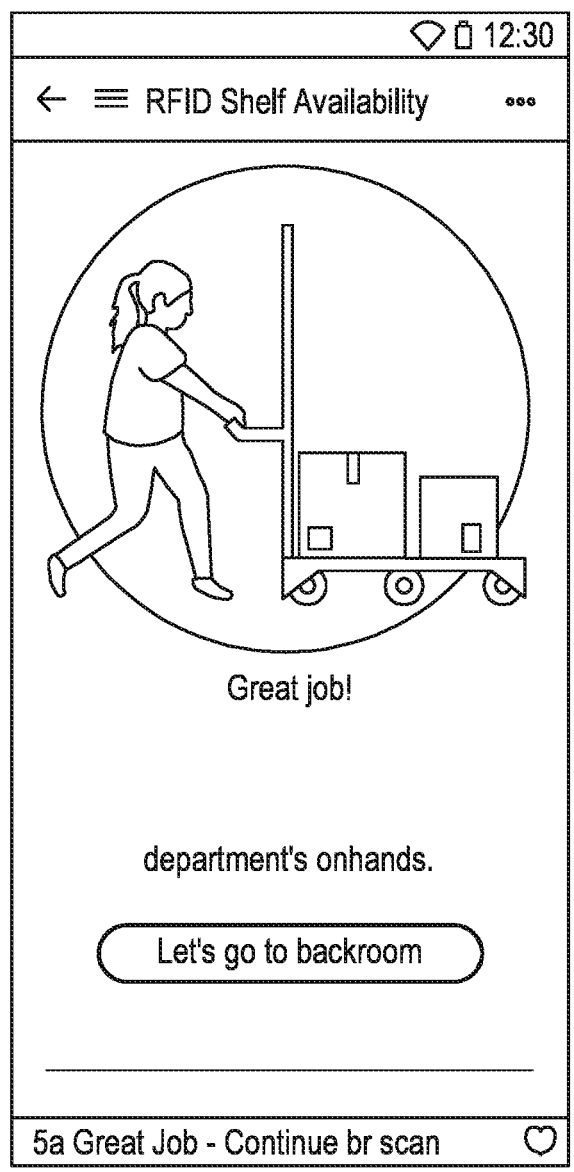
FIG. 27 is an exemplary screenshot illustrating scan of all sub-locations within a selected scan location is complete.

FIG. 27 is an exemplary screenshot 2700 illustrating scan of all sub-locations within a selected scan location is complete. The system provides instructions on where the user should scan next if additional scan locations remain unscanned.

Figure 28:
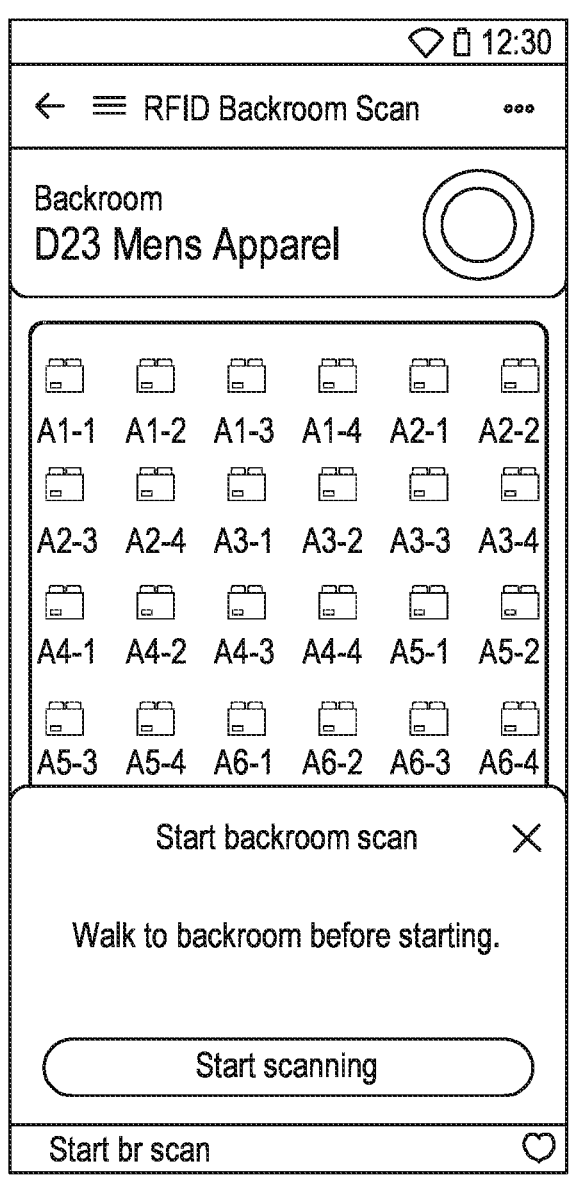
FIG. 28 is an exemplary screenshot illustrating instructions to begin scanning in a next selected scan location.

FIG. 28 is an exemplary screenshot 2800 illustrating instructions to begin scanning in a next selected scan location. In this non-limiting example, the next selected scan location is a backroom (storage) area.

Figure 29:
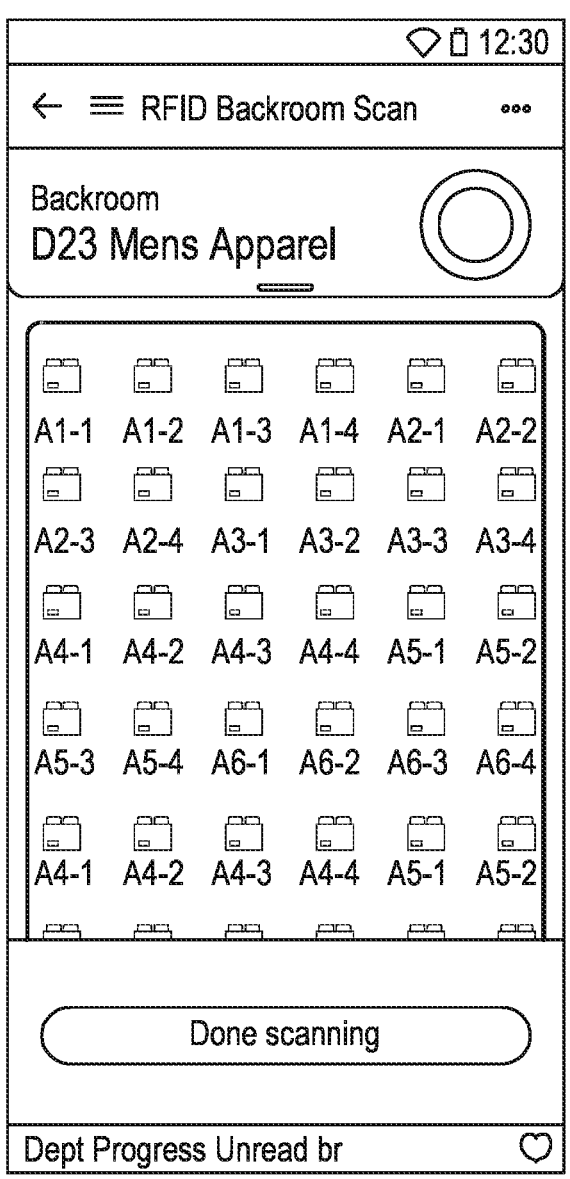
FIG. 29 is an exemplary screenshot illustrating a plurality of icons representing a plurality of sub-locations in a second selected scan area.

FIG. 29 is an exemplary screenshot 2900 illustrating a plurality of icons representing a plurality of sub-locations in a second selected scan area. In this example, the plurality of icons represent sub-locations within a backroom (storage) area.

Figure 30:
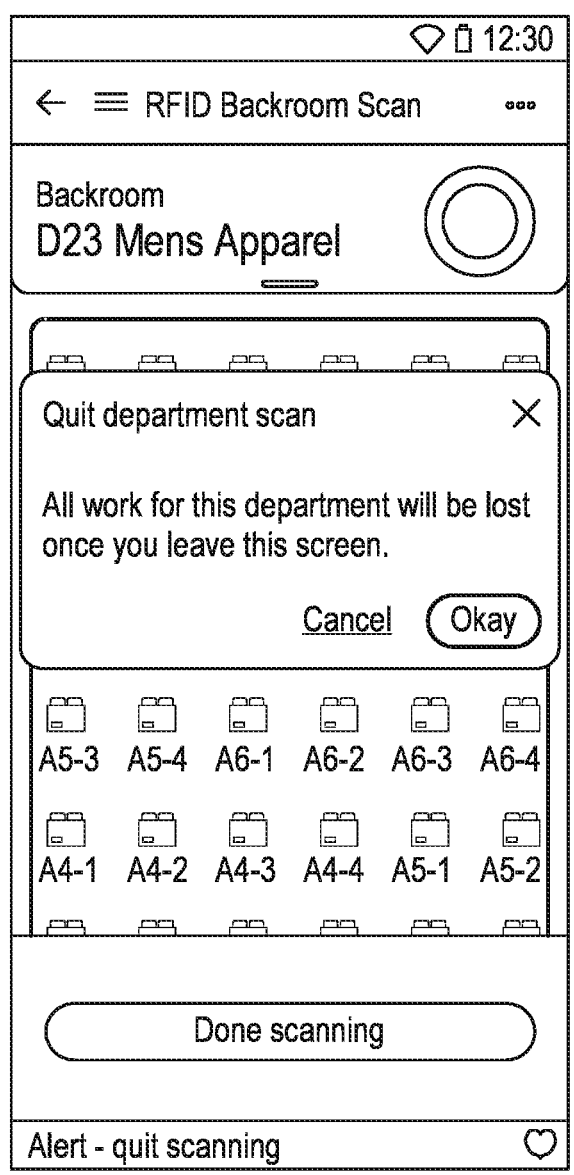
FIG. 30 is an exemplary screenshot illustrating a quit department scan notification.

FIG. 30 is an exemplary screenshot 3000 illustrating a quit department scan notification. The system provides a warning that if the user chooses to quit, all gathered data for the sub-location will be lost.

Figure 31:
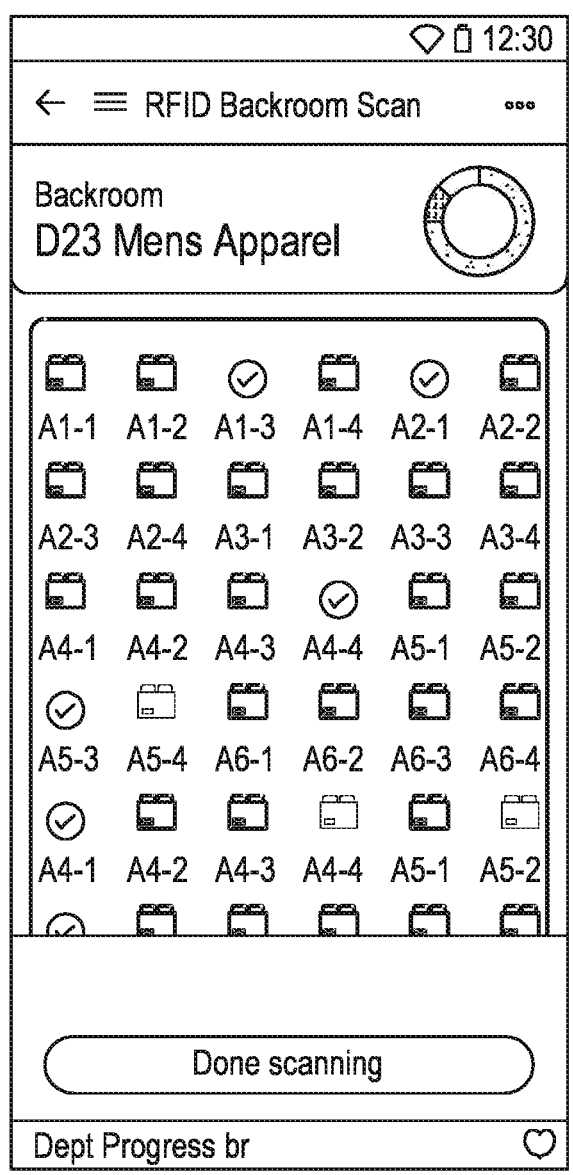
FIG. 31 is an exemplary screenshot illustrating status indicators associated with the second selected scan location.

FIG. 31 is an exemplary screenshot 3100 illustrating status indicators associated with the second selected scan location. Each checkmark indicates a sub-location which has been accurately and completely scanned. The bold icons represent sub-locations in which a scan is in progress but has not yet been successfully completed. The lightest icons represent locations for which no scan data has yet been received (no scan begun).

Figure 32:
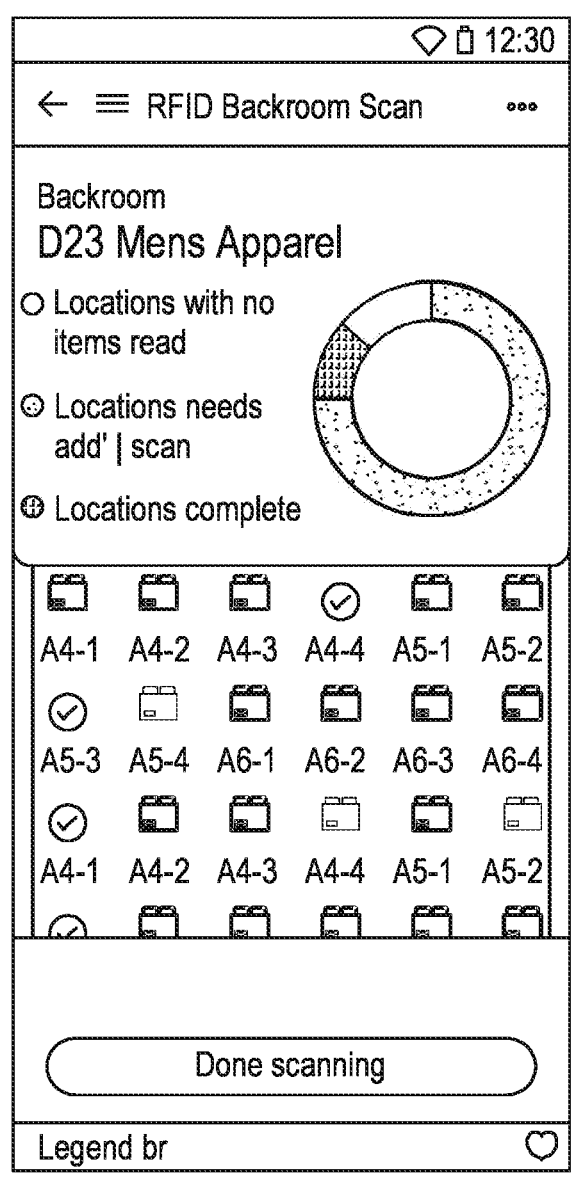
FIG. 32 is an exemplary screenshot illustrating an accuracy indicator ring associated with the second selected location.

FIG. 32 is an exemplary screenshot 3200 illustrating an accuracy indicator ring associated with the second selected location. The accuracy indicator indicates a percentage or proportion of a backroom storage area which is completely scanned, incompletely scanned, or not yet scanned.

Figure 33:
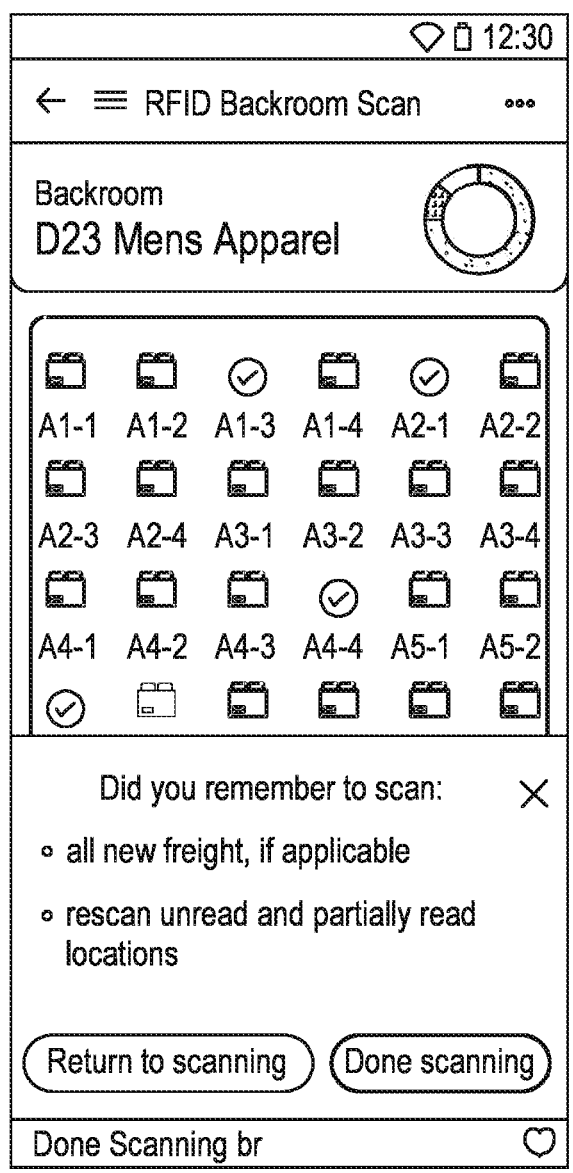
FIG. 33 is an exemplary screenshot illustrating a rescan notification associated with one or more sub-locations within the second selected scan location.

FIG. 33 is an exemplary screenshot 3300 illustrating a rescan notification associated with one or more sub-locations within the second selected scan location. The rescan notification is presented to the user if one or more sub-locations within the scan location are incompletely scanned or in which no scan data has yet been received. A scan is incomplete if the threshold number of expected items/item types are not detected.

Figure 34:
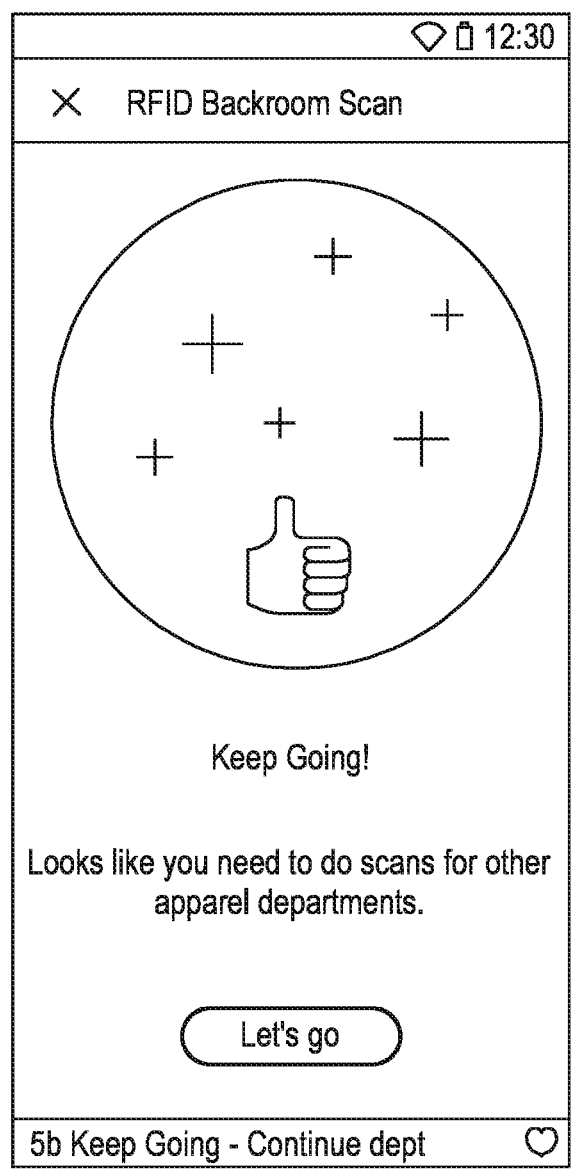
FIG. 34 is an exemplary screenshot illustrating feedback indicating all sub-locations within the second selected scan location are successfully completed.

FIG. 34 is an exemplary screenshot 3400 illustrating feedback indicating all sub-locations within the second selected scan location are successfully completed. The feedback is presented if the system determines all sub-locations have been accurately scanned based on the expected assortment of items and the detected items.

Figure 35:
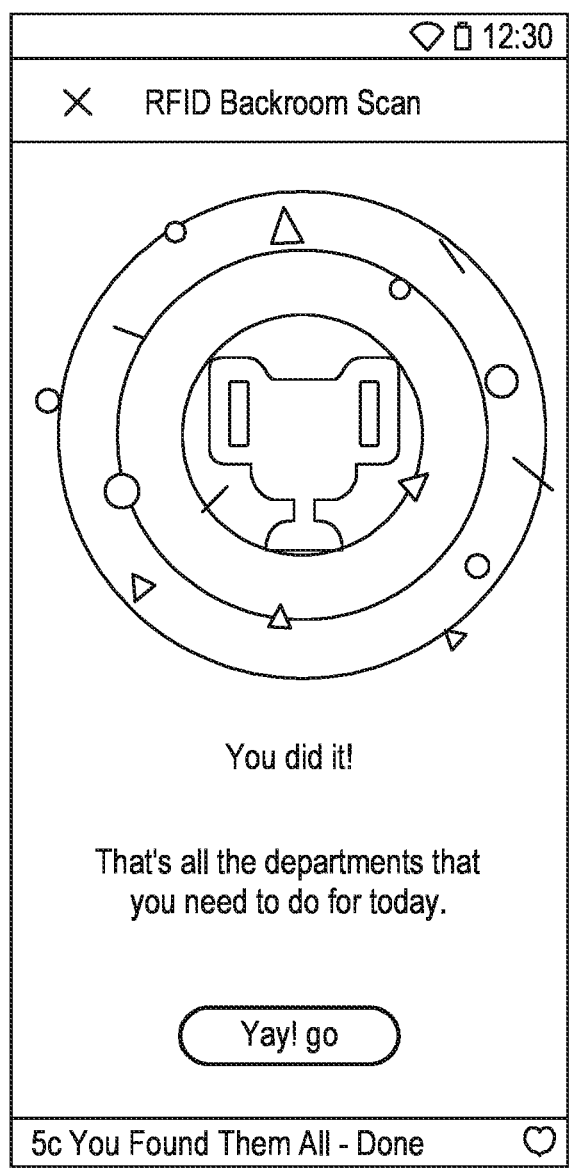
FIG. 35 is an exemplary screenshot illustrating feedback indicating all assigned scans for all assigned locations and sub-locations is successfully completed.

FIG. 35 is an exemplary screenshot 3500 illustrating feedback indicating all assigned scans for all assigned locations and sub-locations is successfully completed. In this example, the feedback indicates that the scans for all assigned scan locations for the day are complete.

Figure 36:
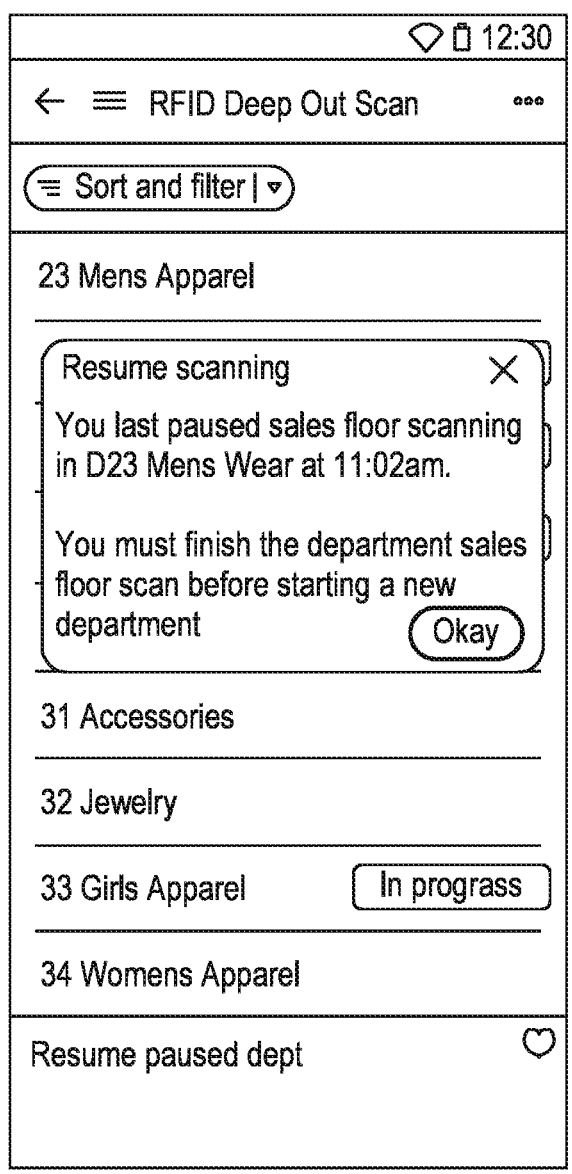
FIG. 36 is an exemplary screenshot illustrating a paused scan reminder.

FIG. 36 is an exemplary screenshot 3600 illustrating a paused scan reminder. In this example, the reminder includes an instruction to the user to continue scanning one or more sub-locations associated with a department "D23."

Figure 37:
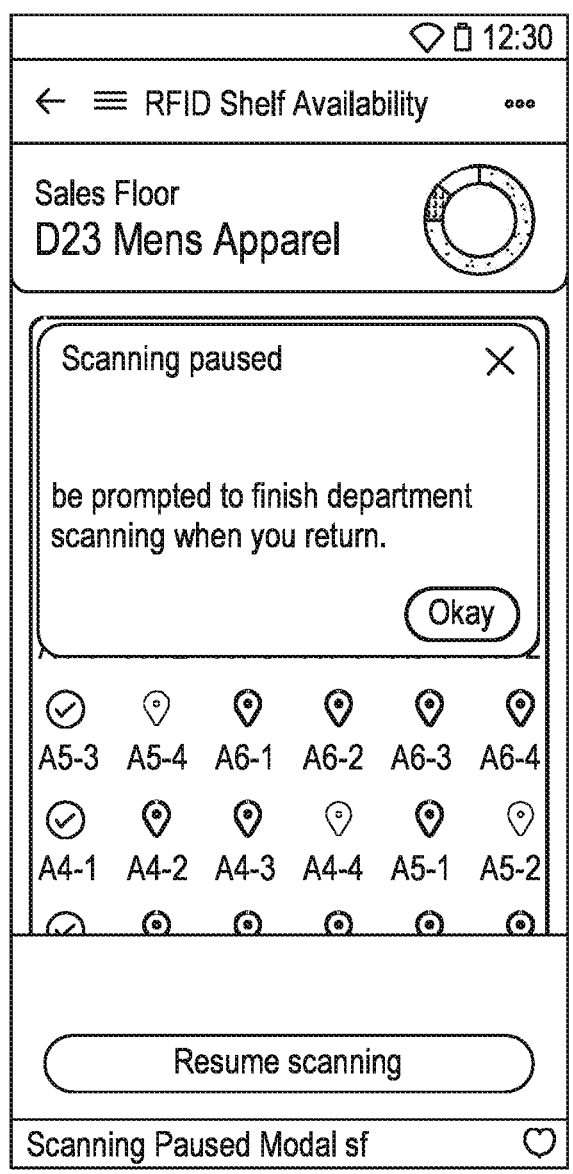
FIG. 37 is an exemplary screenshot illustrating a paused scan notification associated with at least one sub-location.

FIG. 37 is an exemplary screenshot 3700 illustrating a paused scan notification associated with at least one sub-location. In this non-limiting example, the sub-location is an area within a backroom storage area.

Figure 38:
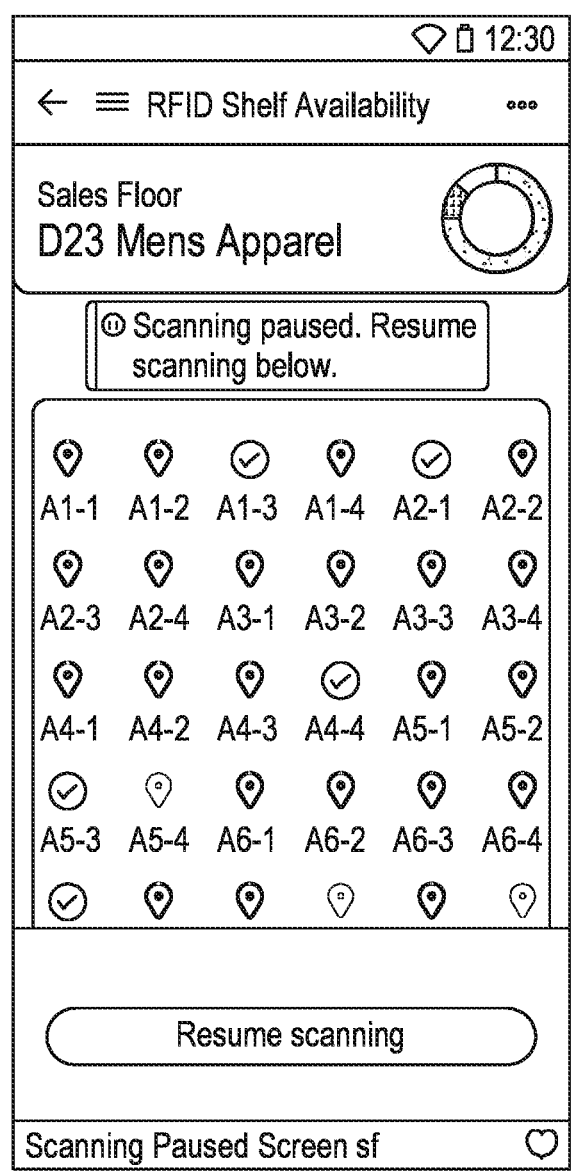
FIG. 38 is an exemplary screenshot illustrating a plurality of status indicators, at least one accuracy indicator and a paused scan indicator.

FIG. 38 is an exemplary screenshot 3800 illustrating a plurality of status indicators, at least one accuracy indicator and a paused scan indicator. In this example, the indicators are associated with a selected scan location within an item display area.

Figure 39:
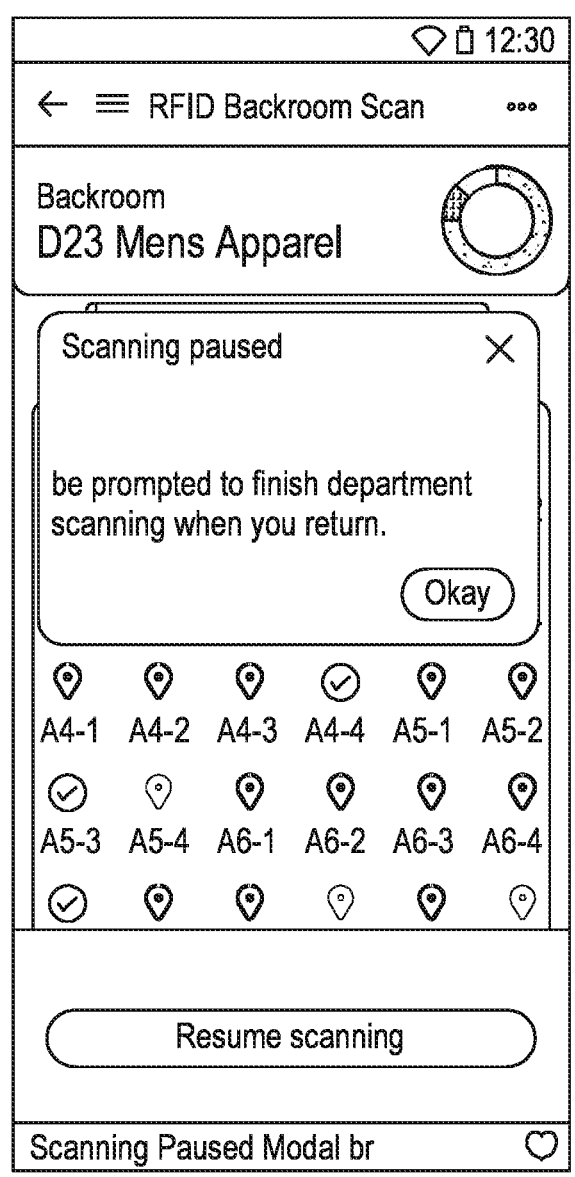
FIG. 39 is an exemplary screenshot illustrating a paused scan notification associated with the second scan location.

FIG. 39 is an exemplary screenshot illustrating a paused scan notification associated with the second scan location. In this example, the paused scan notification indicates scanning of one or more sub-locations within a backroom storage area is paused.

Figure 40:
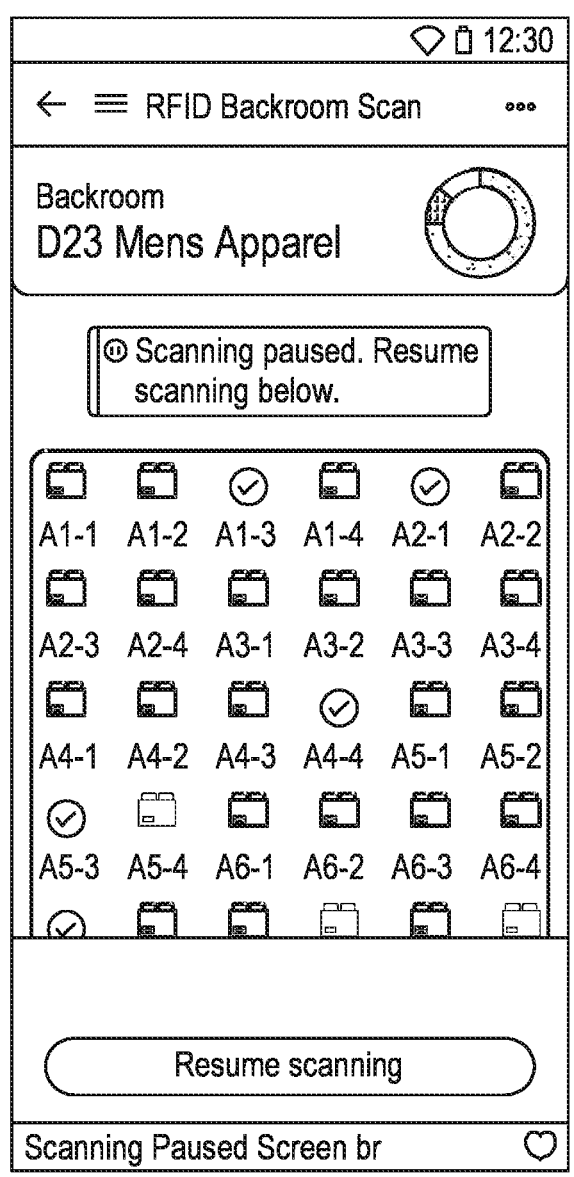
FIG. 40 is an exemplary screenshot illustrating a plurality of status indicators, at least one accuracy indicator and a paused scan indicator associated with the second scan location.

FIG. 40 is an exemplary screenshot 4000 illustrating a plurality of status indicators, at least one accuracy indicator and a paused scan indicator associated with the second scan location. In this example, the indicators are associated with one or more sub-locations within a backroom storage area.

Additional Examples

In some examples, as a user gathers RFID tag data using an RFID tag reader (wand), the user can see their progress via status indicators presented dynamically in real-time on the user interface. The user can hear and see feedback generated by the system indicating scanning progress. The indicators show the user which areas and which sub-locations within an area have been scanned, which areas have not been scanned, and which areas have been partially scanned. The accuracy indicators also inform the user as to how well each are and/or sub-location within an area was scanned.

In a non-limiting example scenario, a status indicator for a sub-location is initially presented in a grey color indicating the sub-location has not been scanned yet. When the user begins scanning, the indicator changes to a green color. When the scan is complete, the indicator changes to a blue color.

In other examples, the system outputs instructions directing the user as to which areas to scan next. The system reminds the user of alternate locations where products can be in the building that should be scanned. When all areas and/or sub-locations on a sales floor are complete, the system directs the user to begin scanning areas in the backroom. Once scanning for a department is complete, the system analyzes the data to determine if the scan is accurate. An accurate scan is a scan that gathers all the RFID tag data from all the RFID tags that are expected to be found within the store or other scanning area. If the results are accurate, the system accepts the scan results. If the results do not reach a threshold confidence level, the system directs a user to re-run the scan or makes another recommendation, such as, but not limited to, a recommendation to perform a manual verification or perform some other type of scan, such as a barcode scan.

In other examples, the system provides feedback to the user for each area, each shelf, each rack that is being scanned. This rack-by-rack accuracy determination enables the system to know whether the RFID tag data is complete or if it is likely RFID tag data is missing or the scan is incomplete. When a scan is complete, logic determines whether scan is a quality scan for that department. The system validates at a rack level and for all items in a department's population to determine if a scan is acceptable for use in on-hand inventory updates/changes.

The expected population of items, in some examples, is an expected representation of an assortment of items calculated based on population of items assigned to the modular display which are RFID tag eligible. The expected population value is calculated for each scan location for prior to each scan. In other words, the expected population is calculated on a per-store, per-scan location, and per-daily basis to reflect store specific items and combinations of items. The expected population reflects a representation of an assortment of items rather a count value. If the detected items are close enough to the expected population, it indicates the majority of RFID tags within the scan location were scanned. This indicates the user performing the scan was close enough to the modular display to capture all the RFID tags on items on the modular display.

In other examples, the system associates discrete locations/areas with expected population of items to determine if RFID tag scans are accurate. This enables improved accuracy of scanning and reduces errors in on-hand inventory due to incorrectly performed scans or scans which fail to gather RFID tag data from all Could apply in DC, warehouse, other spaces besides SF and backroom in store. It would need modifications, but it could work anywhere you wanted to gather information in product.

If the discrepancy between the expected population of items and the detected items is significant (exceeds threshold maximum discrepancy), other data points may be used to verify the on-hand inventory. Other data points can include, without limitation, barcode scan data, nil pick data indicating an item is not available (item outs), manual counts, visual checks, or any other data which can be used to verify on-hand inventory values are correct.

In an example scenario, the system utilizes a combination of item level and modular data associated with apparel items within a clothing department to construct an expected population of items. The system compares the actual RFID tags picked up by the scanner with the expected population of items. The system uses audio and visual cues to denote whether a user has completed their RFID scan of modular displays within a plurality of scan locations. The system notifies a user if any of the displays (racks) need to be rescanned. Rescan instructions are triggered by major discrepancies between the types of items expected to be found and the actual items detected during the scan. If upon rescan, more items are identified and a sufficiently lower discrepancy results based on a threshold, the on-hand adjustment to inventory can be made.

In another example, if a major discrepancy is still seen upon completing the rescan, the system relies on other signals and their associated confidence metrics to determine whether to drive an on-hand inventory change. For example, in order to make a confident change to the on-hand inventory, it may utilize other signals (nil picks, etc.) to combine with the low confidence RFID signal, thus making the overall metric one of higher confidence, and then possibly make a more accurate on-hand inventory adjustment.

In still another example, the system checks an expected population of items within a store. The system uses a combination of an item level and a modular (product display) data to construct the expected number of items. The system compares an actual RFID tag data detected by an RFID tag scanner with the expected population of items. The system provides a feedback to a user performing the scan if the actual scanned items match the expected count. The system includes a user interface to display the feedback. The feedback indicates whether the scan is complete, whether the scan returned results matching the expected population of items, and/or whether a re-scan is needed. The system determines if update to an on-hand inventory should be made using the scan data based on a threshold confidence level. The system uses other signals, such as visual inventory checks, scanning UPC codes/labels or other methods, if a discrepancy occurs upon completing a rescan. This enables a user to scan a department and obtain accurate on-hand inventory updates regardless of whether items are tagged. The system further prevents data obtained during incorrectly performed scans or incomplete scans from being used to modify inventory data.

Alternatively, or in addition to the other examples described herein, examples include any combination of the following:
- updating a plurality of status indicators within a scan area map displayed by the user interface device;
- wherein each status indicator indicates a current scan status for each unique scan location within the plurality of scan locations within the scan area;
- wherein a status indicator comprises at least one of a scan complete indicator, a no scan indicator, or a scan in progress indicator;
- updating, via the user interface device, a plurality of accuracy indicators associated with the plurality of scan location within the scan area;
- wherein an accuracy indicator is associated with each scan location, wherein an accuracy indicator comprises at least one of a scan successful indicator, a scan partially successful indicator or a scan unsuccessful indicator;
- rejecting an update of on-hand inventory based on the RFID tag data received from the plurality of RFID tags until the discrepancy is resolved;
- analyzing rescan RFID tag data received during an instructed rescan of at least one scan location within the plurality of scan locations associated with the scan area;
- identifying a second set of detected item types within the at least one scan location;
- comparing the second set of detected item types with the expected population of items;
- providing feedback indicating the scan of the at least one scan location is complete in response to the comparison indicating the lack of discrepancy;
- requesting an on-hand inventory verification in response to detecting the discrepancy between the expected population of items and the second set of detected item types, wherein the update to the on-hand inventory is rejected until the discrepancy is resolved;
- comparing a percentage value associated with the discrepancy to a threshold confidence level;
- permitting an update to the on-hand inventory using the received RFID tag data in response to the percentage value of the discrepancy exceeding a threshold confidence level;
- wherein the update to the on-hand inventory using the received RFID tag data is denied if the threshold confidence level indicates a number of items detected via at least one RFID scan of the selected scan location falls below a minimum confidence level;
- calculate an expected population of items for a selected scan location based on item level data and modular display data, the expected population of items comprising a set of item types;
- analyzing RFID tag data associated with a plurality of items in the selected scan location to identify a set of detected item types;
- comparing the set of detected item types with the expected population of items;
- determine whether a discrepancy exists between the set of detected item types and the expected population of items;
- update a status indicator associated with the selected scan location from a scan incomplete indicator to a scan complete indicator in response to the comparison indicating a lack of discrepancy;
- provide rescan instructions instructing at least one user to rescan the selected scan location in response to detecting the discrepancy;
- a data storage device comprising on-hand inventory data, wherein an inventory update component permits an update of on-hand inventory data based on the RFID tag data received from the plurality of RFID tags if the comparison indicates the lack of the discrepancy or if the discrepancy is resolved;
- a data storage device comprising on-hand inventory data, wherein an inventory update component rejects an update of the on-hand inventory based on the RFID tag data received from the plurality of RFID tags if the comparison indicates the discrepancy exists between the expected population of items and the detected set of items;
- wherein the update is disallowed until the discrepancy is resolved;
- a user interface device presenting a plurality of status indicators within a scan area map display;
- wherein each status indicator indicates a current scan status for each unique scan location within the plurality of scan locations within the scan area;
- wherein a status indicator comprises at least one of a scan complete indicator, a no scan indicator, or a scan in progress indicator;
- a user interface device comprising a plurality of accuracy indicators associated with a plurality of scan location within the scan area, wherein an accuracy indicator is associated with each scan location;
- wherein an accuracy indicator comprises at least one of a scan successful indicator, a scan partially successful indicator or a scan unsuccessful indicator;
- a user device associated with a user performing at least one scan of at least one scan location within a scan area;
- the user device providing feedback to the user, wherein the feedback comprises at least one of audio feedback, visual feedback, or haptic feedback;
- analyze rescan RFID tag data received during an instructed rescan of at least one scan location within the plurality of scan locations associated with the scan area;

identify a second set of detected item types within the at least one scan location;
compare the second set of detected item types with the expected population of items;
provide feedback indicating the scan of the at least one scan location is complete in response to the comparison indicating the lack of discrepancy;
request an on-hand inventory verification in response to detecting the discrepancy between the expected population of items and the second set of detected item types;
wherein the update to the on-hand inventory is rejected until the discrepancy is resolved;
compare a percentage value associated with the discrepancy to a threshold confidence level;
permit an update to the on-hand inventory using the received RFID tag data in response to the percentage value of the discrepancy exceeding a threshold confidence level;
wherein the update to the on-hand inventory using the received RFID tag data is denied if the threshold confidence level indicates a number of items detected via at least one RFID scan of the selected scan location falls below a minimum confidence level;
a user interface device, wherein the user interface device outputs feedback indicating a scan of all locations within the first scan area are complete;
wherein an instruction to proceed with scanning locations within a second scan location is output via the user interface device;
analyzing, by an analysis component, radio frequency identification (RFID) tag data received from a plurality of RFID tags associated with a plurality of items within the selected scan location to identify a set of detected item types;
comparing, by a comparison component, the set of detected item types with an expected population of items, the expected population of items calculated based on item level data and modular display data;
display, via a user interface device, a status indicator associated with the selected scan location, the status indicator indicating whether a scan of the selected scan location is complete or incomplete based on a result of the comparison of the expected population of items and the set of detected items;
reject an update of on-hand inventory data using the RFID tag data received from the plurality of RFID tags if the comparison indicates the discrepancy between the detected item types and the expected population of items exists;
wherein the update of the on-hand inventory data is rejected until the discrepancy is resolved;
send, to a user interface device, rescan instructions instructing a user associated with the user interface device to rescan the selected scan location in response to detecting the discrepancy exists between the set of detected item types and the expected population of items;
calculate a plurality of expected populations of items for the plurality of scan locations within the scan area;
wherein at least one expected population of items is constructed for each unique scan location within the scan area, wherein MD tag data for each scan location is compared with the expected population of items for each scan location to determine whether the scan of each scan location within the plurality of scan locations is completed accurately;
updating a plurality of status indicators within a scan area map displayed by the user interface device;
wherein each status indicator indicates a current scan status for each unique scan location within the plurality of scan locations within the scan area, wherein a status indicator comprises at least one of a scan complete indicator, a no scan indicator, or a scan in progress indicator;
updating, via the user interface device, a plurality of accuracy indicators associated with the plurality of scan location within the scan area, wherein an accuracy indicator is associated with each scan location; and
wherein an accuracy indicator comprises at least one of a scan successful indicator, a scan partially successful indicator or a scan unsuccessful indicator.

At least a portion of the functionality of the various elements in FIG. 1, FIG. 2, FIG. 3, FIG. 4, FIG. 5, FIG. 6, and FIG. 7 can be performed by other elements in FIG. 1, FIG. 2, FIG. 3, FIG. 4, FIG. 5, FIG. 6, and FIG. 7, or an entity (e.g., processor 106, web service, server, application program, computing device, etc.) not shown in FIG. 1, FIG. 2, FIG. 3, FIG. 4, FIG. 5, FIG. 6, and FIG. 7.

In some examples, the operations illustrated in FIG. 8, FIG. 9, FIG. 10, FIG. 11, and FIG. 12 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of on-hand inventory accuracy using RFID tag data, the method comprising calculating an expected population of items for a selected scan location within a plurality of scan locations in a scan area; analyzing radio frequency identification (RFID) tag data received from a plurality of RFID tags associated with a plurality of items within the selected scan location to identify a set of detected item types; comparing the set of detected item types with the expected population of items using a threshold to determine whether a discrepancy exists between the set of detected item types and the expected population of items; update a status indicator associated with the selected scan location from a scan incomplete indicator to a scan complete indicator in response to the comparison indicating a lack of discrepancy between the expected population of items and the set of detected items; and provide rescan instructions comprising an instruction to rescan the selected scan location in response to detecting the discrepancy.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for on-hand inventory accuracy using RFID tag data. For example, the elements illustrated in FIG. 1, FIG. 2, FIG. 3, FIG. 4, FIG. 5, FIG. 6, and FIG. 7, such as when encoded to perform the operations illustrated in FIG. 1, FIG. 2, FIG. 3, FIG. 4, FIG. 5, FIG. 6 and FIG. 7, constitute exemplary means for calculating an expected population of items for a selected scan location based on item level data and modular display data, the expected population of items comprising a set of item types; exemplary means for analyzing RFID tag data associated with a plurality of items in the selected scan location to identify a set of detected item types; exemplary means for comparing the set of detected item types with the expected population of items; exemplary means for determining whether a discrepancy exists between the set of detected item types and the expected population of items; exemplary means for updating a status indicator associated with the selected scan location from a scan incomplete indicator to a scan complete indicator in response to the comparison indicating a lack of discrepancy; and exemplary means for providing rescan instructions instructing at least one user to rescan the selected scan location in response to detecting the discrepancy.

Other non-limiting examples provide one or more computer storage devices having a first computer-executable instructions stored thereon for providing on-hand inventory accuracy determinations using RFID data. When executed by a computer, the computer performs operations including analyzing radio frequency identification (RFID) tag data received from a plurality of RFID tags associated with a plurality of items within the selected scan location to identify a set of detected item types; comparing the set of detected item types with an expected population of items, the expected population of items calculated based on item level data and modular display data; determining whether a discrepancy exists between the set of detected item types and the expected population of items; displaying, via a user interface device, a status indicator associated with the selected scan location, the status indicator indicating whether a scan of the selected scan location is complete or incomplete based on a result of the comparison of the expected population of items and the set of detected items; and rejecting an update of on-hand inventory data using the RFID tag data received from the plurality of RFID tags if the comparison indicates the discrepancy between the detected item types and the expected population of items exists, wherein the update of the on-hand inventory data is rejected until the discrepancy is resolved.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a radio frequency identification (RFID) tag reader configured to scan RFID tags in a selected scan location on a sales floor responsive to a user beginning a scan sub-locations within the selected scan location;
   processor(s) configured to obtain RFID tag data from the RFID tag reader;
   a memory communicatively coupled to the processor(s) and having stored thereon computer-executable instructions causing the processor(s) to:
   calculate an expected population of items for the selected scan location based on item level data and modular display data, the expected population of items comprising a set of item types;
   identify a set of detected item types within the selected scan location based on the RFID tag data;
   compare the set of detected item types with the expected population of items;
   determine whether a discrepancy exists between the set of detected item types and the expected population of items based on the comparison;
   provide rescan instructions in response to detecting the discrepancy, the rescan instructions for instructing the user to rescan one or more of the scan sub-locations affected by the discrepancy; and
   a user interface device configured to use a graphical user interface to display instructions for pairing the RFID tag reader with the user interface device, to display a first graphical icon representing the selected scan location on the sales floor, to display second graphical icons representing the scan sub-locations within the selected scan location, to associate a no scan status indicator with the selected scan location prior to the user beginning the scan of a first one of the scan sub-locations, to replace the corresponding no scan status indicator with a scan in progress status indicator responsive to the user beginning the scan of the first scan sub-location, to display a circular graphical icon indicating a percentage of the scan sub-locations for which scanning is complete, to display the rescan instructions instructing the user to rescan the one or more scan sub-locations affected by the discrepancy, and to replace the scan in progress status indicator with a scan complete status indicator responsive to the user completing the rescan of the one or more scan sub-locations affected by the discrepancy.

2. The system of claim 1, further comprising:
   a data storage device configured to update on-hand inventory data based on the RFID tag data.

3. The system of claim 2, wherein the on-hand inventory is updated in response to a percentage value of the discrepancy exceeding a threshold confidence level.

4. The system of claim 1, wherein the user interface device is further configured to use the graphical user interface to display instructions instructing the user to proceed with scanning a next scan location responsive to the user completing the rescan of the selected scan location.

5. The system of claim 1, wherein the circular graphical icon is updated as scans of additional scan sub-locations are completed to reflect an increase in the percentage of the scan sub-locations for which scanning is complete.

6. The system of claim 1, wherein the circular graphical icon is updated as re-scans of the one or more scan sub-locations affected by the discrepancy are complete.

7. A method comprising:
scanning, via a radio frequency identification (RFID) tag reader, RFID tags in a selected scan location on a sales floor responsive to a user beginning a scan sub-locations within the selected scan location;
calculating an expected population of items for the selected scan location based on item level data and modular display data, the expected population of items comprising a set of item types;
identifying a set of detected item types within the selected scan location based on RFID tag data generated from scanning the RFID tags;
comparing the set of detected item types with the expected population of items;
determining whether a discrepancy exists between the set of detected item types and the expected population of items based on the comparison;
providing rescan instructions in response to detecting the discrepancy, the rescan instructions for instructing the user to rescan one or more of the scan sub-locations affected by the discrepancy; and
displaying, via a graphical user interface of a user interface device, prompts to assist a user in performing an inventory scan of at least the selected scan location, wherein displaying the prompts via the graphical user interface of the user interface device includes displaying instructions for pairing the RFID tag reader with the user interface device, displaying a first graphical icon representing the selected scan location on the sales floor, displaying second graphical icons representing the scan sub-locations within the selected scan location, associating a no scan status indicator with the selected scan location prior to the user beginning the scan of a first one of the scan sub-locations, replacing the corresponding no scan status indicator with a scan in progress status indicator responsive to the user beginning the scan of the first scan sub-location, displaying a circular graphical icon indicating a percentage of the scan sub-locations for which scanning is complete, displaying the rescan instructions instructing the user to rescan the one or more scan sub-locations affected by the discrepancy, and replacing the scan in progress status indicator with a scan complete status indicator responsive to the user completing the rescan of the one or more scan sub-locations affected by the discrepancy.

8. The method of claim 7, further comprising:
updating, by a data storage device, on-hand inventory data based on the RFID tag data.

9. The method of claim 8, wherein the on-hand inventory is updated in response to a percentage value of the discrepancy exceeding a threshold confidence level.

10. The method of claim 7, wherein displaying the prompts via the graphical user interface of the user interface device further includes instructing the user to proceed with scanning a next scan location responsive to the user completing the rescan of the selected scan location.

11. The method of claim 7, wherein the circular graphical icon is updated as scans of additional scan sub-locations are completed to reflect an increase in the percentage of the scan sub-locations for which scanning is complete.

12. The method of claim 7, wherein the circular graphical icon is updated as re-scans of the one or more scan sub-locations affected by the discrepancy are complete.

13. One or more computer storage devices having computer-executable instructions that, when executed by processor(s), cause the processor(s) to perform the following operations: scanning, via a radio frequency identification (RFID) tag reader, RFID tags in a selected scan location on a sales floor responsive to a user beginning a scan sub-locations within the selected scan location;
calculating an expected population of items for the selected scan location based on item level data and modular display data, the expected population of items comprising a set of item types;
identifying a set of detected item types within the selected scan location based on RFID tag data generated from scanning the RFID tags;
comparing the set of detected item types with the expected population of items;
determining whether a discrepancy exists between the set of detected item types and the expected population of items based on the comparison;
providing rescan instructions in response to detecting the discrepancy, the rescan instructions for instructing the user to rescan one or more of the scan sub-locations affected by the discrepancy; and
displaying, via a graphical user interface of a user interface device, prompts to assist a user in performing an inventory scan of at least the selected scan location, wherein displaying the prompts via the graphical user interface of the user interface device includes displaying instructions for pairing the RFID tag reader with the user interface device, displaying a first graphical icon representing the selected scan location on the sales floor, displaying second graphical icons representing the scan sub-locations within the selected scan location, associating a no scan status indicator with the selected scan location prior to the user beginning the scan of a first one of the scan sub-locations, replacing the corresponding no scan status indicator with a scan in progress status indicator responsive to the user beginning the scan of the first scan sub-location, displaying a circular graphical icon indicating a percentage of the scan sub-locations for which scanning is complete, displaying the rescan instructions instructing the user to rescan the one or more scan sub-locations affected by the discrepancy, and replacing the scan in progress status indicator with a scan complete status indicator responsive to the user completing the rescan of the one or more scan sub-locations affected by the discrepancy.

14. The one or more or more computer storage devices of claim 13, wherein the computer-executable instructions further cause the processor(s) to perform the following operation:
updating, by a data storage device, on-hand inventory data based on the RFID tag data.

15. The one or more or more computer storage devices of claim 14, wherein the on-hand inventory is updated in response to a percentage value of the discrepancy exceeding a threshold confidence level.

16. The one or more or more computer storage devices of claim 13, wherein displaying the prompts via the graphical user interface of the user interface device further includes displaying instructions instructing the user to proceed with scanning a next scan location responsive to the user completing the rescan of the selected scan location.

17. The one or more or more computer storage devices of claim 13, wherein the circular graphical icon is updated as scans of additional scan sub-locations are completed to reflect an increase in the percentage of the scan sub-locations for which scanning is complete.

18. The one or more or more computer storage devices of claim 13, wherein the circular graphical icon is updated as re-scans of the one or more scan sub-locations affected by the discrepancy are complete.

* * * * *